(12) United States Patent
Liao et al.

(10) Patent No.: US 11,166,041 B2
(45) Date of Patent: Nov. 2, 2021

(54) HYBRID PIXEL-DOMAIN AND COMPRESSED-DOMAIN VIDEO ANALYTICS FRAMEWORK

(71) Applicant: Intel Corporation, Santa Clara, CA (US)

(72) Inventors: Yiting Liao, Sunnyvale, CA (US); Yen-Kuang Chen, Palo Alto, CA (US); Shao-Wen Yang, San Jose, CA (US); Vallabhajosyula S. Somayazulu, Portland, OR (US); Srenivas Varadarajan, Bangalore (IN); Omesh Tickoo, Portland, OR (US); Ibrahima J. Ndiour, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/457,802

(22) Filed: Jun. 28, 2019

(65) Prior Publication Data

US 2019/0327486 A1 Oct. 24, 2019

(51) Int. Cl.
*H04N 19/52* (2014.01)
*G06K 9/32* (2006.01)
*G06K 9/62* (2006.01)
*G06N 3/04* (2006.01)
*H04N 19/172* (2014.01)
*H04N 19/523* (2014.01)

(52) U.S. Cl.
CPC .......... *H04N 19/52* (2014.11); *G06K 9/3241* (2013.01); *G06K 9/6256* (2013.01); *G06N 3/04* (2013.01); *H04N 19/172* (2014.11); *H04N 19/523* (2014.11)

(58) Field of Classification Search
CPC .... H04N 19/52; H04N 19/523; H04N 19/172; G06N 3/04; G06N 3/08; G06N 3/0454; G06K 9/3241; G06K 9/6256; G06K 9/6201; G06K 9/6271; G06K 9/00744
USPC .................................................. 375/240, 40
See application file for complete search history.

(56) References Cited

U.S. PATENT DOCUMENTS

| | | | |
|---|---|---|---|
| 10,528,819 B1 * | 1/2020 | Manmatha | G06K 9/6262 |
| 2019/0114804 A1 * | 4/2019 | Sundaresan | G06K 9/66 |
| 2019/0138813 A1 * | 5/2019 | Pereira | G06K 9/00718 |
| 2019/0304102 A1 * | 10/2019 | Chen | G06K 9/6271 |

* cited by examiner

*Primary Examiner* — Susan E. Hodges
(74) *Attorney, Agent, or Firm* — Alliance IP, LLC

(57) ABSTRACT

In one embodiment, an apparatus comprises processing circuitry to: receive, via a communication interface, a compressed video stream captured by a camera, wherein the compressed video stream comprises: a first compressed frame; and a second compressed frame, wherein the second compressed frame is compressed based at least in part on the first compressed frame, and wherein the second compressed frame comprises a plurality of motion vectors; decompress the first compressed frame into a first decompressed frame; perform pixel-domain object detection to detect an object at a first position in the first decompressed frame; and perform compressed-domain object detection to detect the object at a second position in the second compressed frame, wherein the object is detected at the second position in the second compressed frame based on: the first position of the object in the first decompressed frame; and the plurality of motion vectors from the second compressed frame.

26 Claims, 13 Drawing Sheets

US 11,166,041 B2

HYBRID PIXEL-DOMAIN AND COMPRESSED-DOMAIN VIDEO ANALYTICS FRAMEWORK

FIELD OF THE SPECIFICATION

This disclosure relates in general to the field of visual computing, and more particularly, though not exclusively, to a hybrid pixel-domain and compressed-domain video analytics framework.

BACKGROUND

In distributed visual analytics systems, images and videos are typically compressed before transmission, and after transmission, they must be subsequently decompressed before their contents can be analyzed. For example, video captured by a camera is often compressed and streamed to the cloud, and the cloud must subsequently decompress the video stream before a deep learning neural network can be used to analyze the underlying visual content. This is because deep learning neutral networks are typically designed and trained to process raw or decompressed (e.g., pixel-domain) visual data as input.

These systems suffer from various drawbacks. For example, streaming video to the cloud often consumes significant amounts of network bandwidth. Moreover, extra computation is required to decompress images and videos before they can be analyzed, which can significantly increase the overall computation time. Further, extra input/output (I/O) bandwidth is required to transmit decompressed images and videos between the decompression engine and the analysis engine, which can significantly increase the requisite I/O bandwidth.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
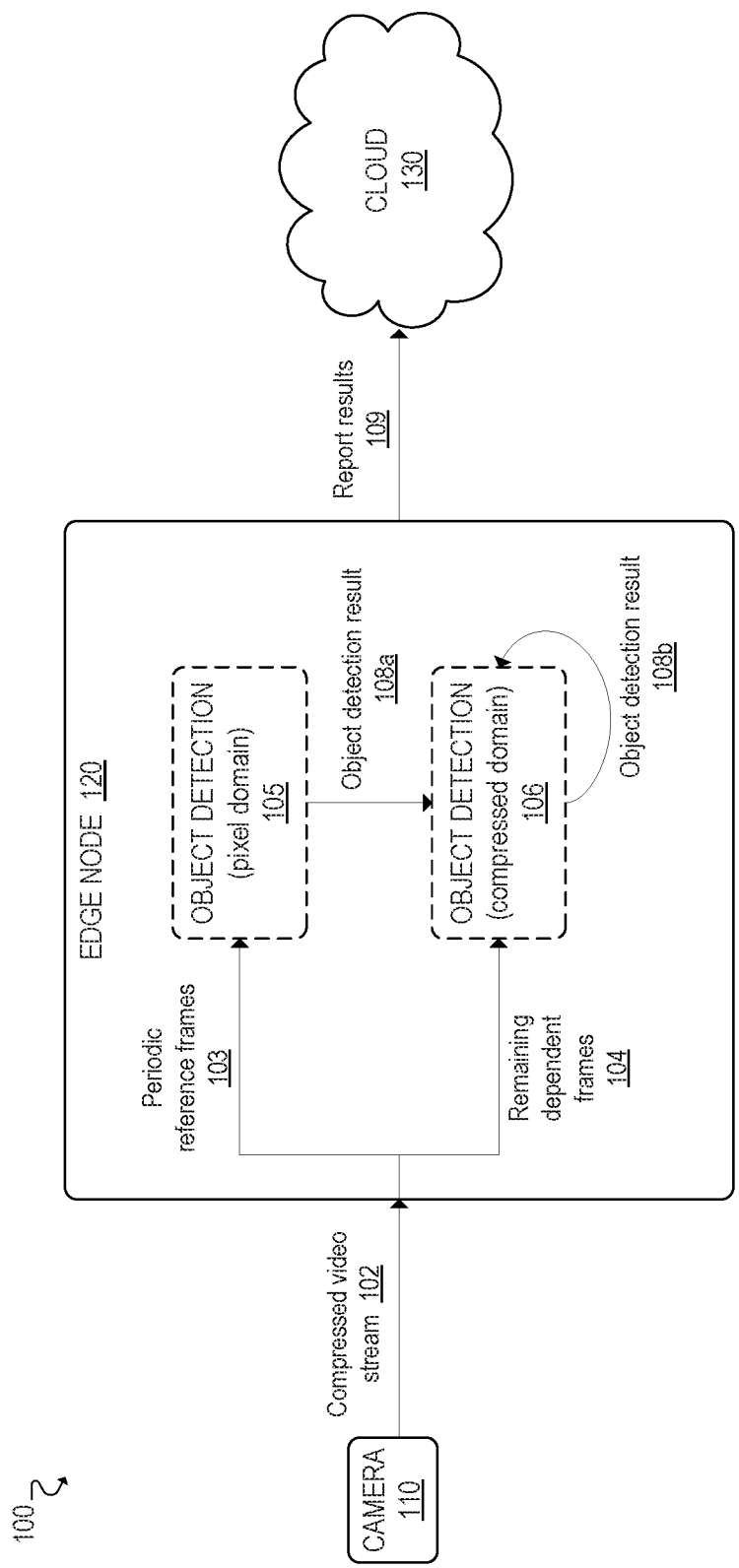
FIG. 1 illustrates an example embodiment of a hybrid video analytics system.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Hybrid Pixel-Domain and Compressed-Domain Video Analytics Framework

In distributed visual analytics systems, images and videos are typically compressed (e.g., transformed from the pixel domain to the compressed domain) before transmission, and after transmission, they must be subsequently decompressed (e.g., transformed back to the pixel domain) before their contents can be analyzed. For example, video captured by a camera is often compressed and streamed to the cloud, and the cloud must subsequently decompress the video stream before a deep learning neural network can be used to analyze the underlying visual content. This is because deep learning neutral networks are typically designed and trained to process raw or decompressed (e.g., pixel-domain) visual data as input.

These systems suffer from various drawbacks. For example, streaming video to the cloud often consumes significant amounts of network bandwidth. Moreover, extra computation is required to decompress images and videos before they can be analyzed, which can increase the overall computation time by up to 100%. Further, extra input/output (I/O) or communication bandwidth (e.g., PCIe bandwidth) is required to transmit decompressed images and videos between the decompression engine and the analysis engine, which can require up to 20 times more I/O bandwidth.

Some computing systems leverage built-in video decompression accelerators (e.g., the Gen Media Engine on Intel Architecture (IA) processors) to reduce the computation time required for decompression. Video decompression accelerators, however, are still encumbered by the increased I/O bandwidth requirements associated with transmitting decompressed visual data between the decompression accelerator and the analysis engine.

Further, many computing systems and processors do not have video decompression accelerators, and as a result, those systems must rely on software decompression, which is typically very slow and increases the power consumption and latency of end-to-end systems.

Accordingly, this disclosure presents a hybrid video analytics framework that processes video streams in both the pixel domain and the compressed domain to improve performance. In particular, the hybrid video analytics framework relies primarily on compressed-domain analytics, while using pixel-domain analytics relatively infrequently. For example, with respect to object detection and tracking, pixel-domain analytics are only used periodically or intermittently to perform object detection on select frames dispersed throughout an incoming video stream, while compressed-domain analytics are used to perform object detection and tracking on all other frames. In this manner, object detection and tracking is primarily performed directly on compressed visual data, while fully decompressed pixel data is only used sparingly.

This solution provides various advantages. In particular, video streams do not need to be fully decompressed before their contents can be analyzed using deep learning neural networks. For example, most frames of a video stream can be processed using compressed visual data that only needs to be partially encoded and decoded, while only a few frames need to be processed using fully decompressed visual data. With various design options, this solution can save computation and memory access during both compression and decompression, as well as reduce the amount of data transmitted over the network.

FIG. 1 illustrates an example embodiment of a hybrid video analytics system 100. In the illustrated example, hybrid video analytics system 100 performs object detection and tracking on a video stream using a hybrid video analytics framework that operates in both the pixel domain and the compressed domain, as explained further below.

In the illustrated embodiment, hybrid video analytics system 100 is a distributed computing system that captures and analyzes video using resources distributed throughout the edge-to-cloud pipeline (which may also be referred to as the "fog"). For example, hybrid video analytics system 100 includes a camera 110 connected to an edge node 120 (e.g., via a local area network (LAN)), which is further connected to the cloud 130 (e.g., via one or more wide area networks (WANs)). The edge node 120 can include any computing device connected at or near the edge of a communications network, such as an edge computing server or edge processing device connected to the same local network as the camera 110. The camera 110 captures video footage of its respective surroundings, and that video footage is then compressed and streamed 102 to the edge node 120 for further processing using hybrid video analytics.

In other embodiments, however, the functionality of hybrid video analytics system 100 can be distributed across any combination of devices and components deployed throughout an edge-to-cloud network topology, including at the edge, in the cloud, and/or anywhere in between in the "fog." For example, the hybrid pixel-domain 105 and compressed-domain 106 analytics can be performed by any combination of cameras 110, edge nodes 120, fog nodes, and/or the cloud 130.

In the illustrated example, the edge node 120 performs object detection and tracking on the video stream 102 and then reports the results 109 to the cloud 130. Typically, performing object detection from scratch (e.g., in the pixel domain) on every frame of a video stream 102 is computationally expensive. Thus, in the illustrated embodiment, object detection is performed from scratch infrequently, and instead, object tracking is used most of the time, which provides a faster and more economical solution. This is accomplished using a hybrid video analytics framework that analyzes a video stream 102 in both the pixel domain and the compressed domain.

In some embodiments, for example, the hybrid video analytics framework may be designed to process a video stream 102 in the following manner:

(1) Perform pixel-domain object detection 105 intermittently or periodically (but infrequently) on select reference frames 103 of the video stream 102, beginning with the first frame of the stream 102 and then on subsequent frames dispersed throughout the stream 102; and (2) Perform compressed-domain object detection and tracking 106 on the remaining frames 104 of the video stream 102 (e.g., using compressed-domain motion vectors from each frame along with the object detection result 108*a,b* from the preceding frame).

Pixel-domain object detection 105 can be performed on periodic reference frames 103 using any suitable object detection technique that operates in the pixel domain (e.g., on raw visual data or pixels), from a simple foreground detection/background subtraction technique to an advanced deep learning technique. Because the video stream 102 is compressed, however, the frames 103 must first be decoded and/or decompressed before pixel-domain object detection 105 can be performed.

In some embodiments, for example, pixel-domain object detection 105 may be performed using a foreground detection/background subtraction technique. For example, in many deployment scenarios, a camera 110 may be fixed-mounted and/or otherwise may not move, and thus all video frames may be captured from the same camera view or perspective. This is particularly common for cameras used in digital security and surveillance systems, among other examples. When the camera view remains static, pixel-domain object detection 105 can be implemented by simply performing foreground detection/background subtraction on the current frame 103 that is being processed.

For example, in circumstances where the camera view remains static, pixel-domain object detection 105 can be performed by simply comparing the current frame 103 to a background frame. In particular, the frame difference can be computed between the current frame 103 and the background frame. If there are no or only nominal differences between the background frame and the current frame 103, there are likely no foreground objects in the current frame 103. However, if there are more substantial differences between the background frame and the current frame 103, those differences are likely caused by foreground object(s) in the current frame 103, which are located in the region(s) of the current frame 103 that differ from the background frame. Thus, in some cases, pixel-domain object detection 105 can simply be performed by taking the frame difference between the background frame and the current frame 103 and identifying region(s) of the current frame 103 that differ from the background frame. This approach is particularly advantageous when pixel-domain object detection 105 is performed using a resource-constrained device, such as a low-end camera 110 and/or edge node 120 with minimal compute capabilities.

Figure 2:
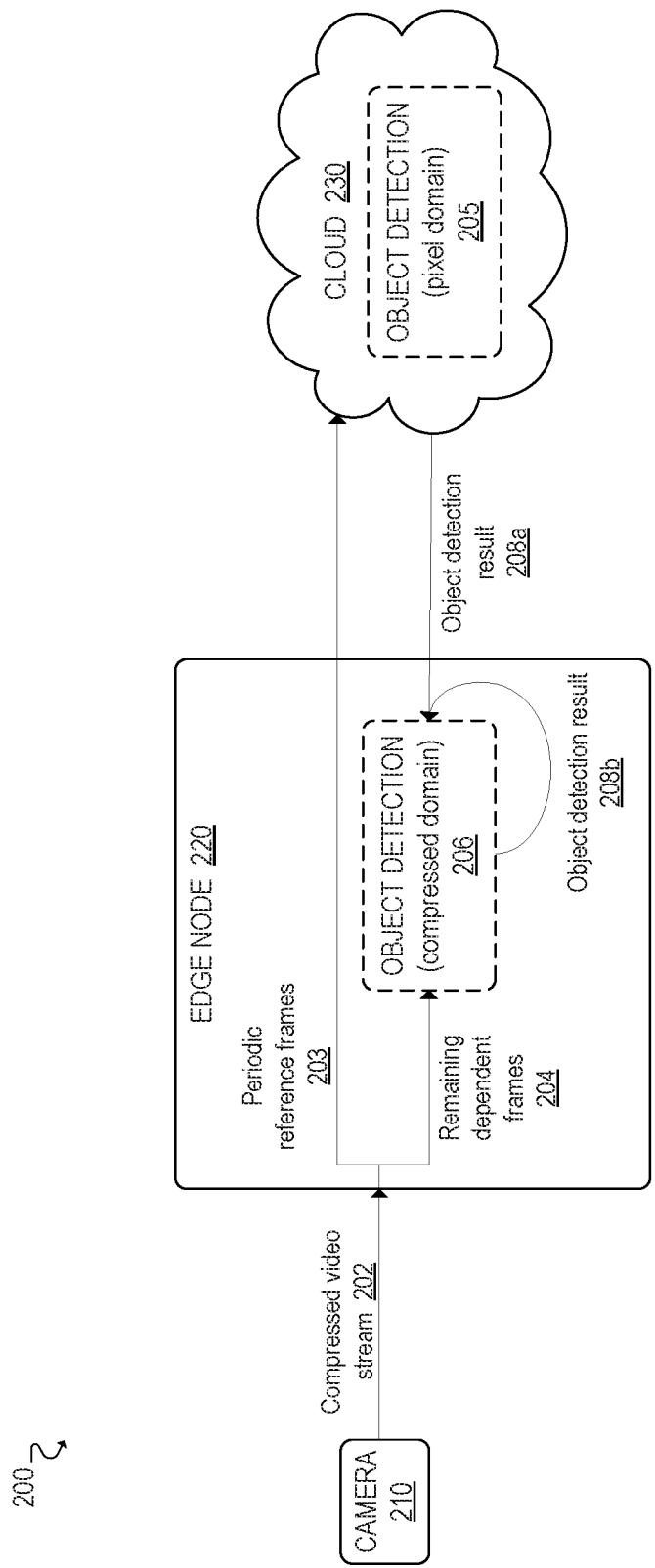
FIG. 2 illustrates another example embodiment of a hybrid video analytics system.

Alternatively, pixel-domain object detection 105 may be performed using state-of-the-art machine learning (ML), deep learning (DL), and/or artificial intelligence (AI) techniques designed for object detection in the pixel domain, such as an object detection convolutional neural network (CNN) (e.g., as shown and described in connection with FIG. 6), among other examples. In this case, if the pixel-domain object detection 105 is too computationally expensive to run on a resource-constrained device, such as the camera 110 or edge node 120, it can instead be performed in the cloud 130 (e.g., as shown in FIG. 2).

Next, compressed-domain object detection 106 is performed on the remaining frames 104 of the video stream. In some embodiments, for example, the object detection result 108*a,b* for the previous frame (or whichever frame the current frame 104 is predicted from) is used in conjunction with the compressed-domain motion vectors from the current frame 104 to predict/track the objects in the current frame 104 (e.g., as shown in FIG. 3B).

For example, object detection may have been performed on the previous video frame in either the pixel domain 105 or the compressed domain 106. The object detection result 108*a,b* for the previous frame—whether obtained in the pixel or compressed domain—may be a bounding box bitmap that identifies which pixels in the frame are occupied by object(s).

Separately, the compression or encoding scheme of the current frame 104 typically includes motion vectors, which represent the estimated motion of macroblocks in the current frame 104 relative to similar macroblocks in previous frame (s).

Thus, in some embodiments, compressed-domain object detection 106 may be implemented using the object bounding boxes from the previous frame and the motion vectors from the current frame 104 to predict where the object bounding boxes are located in the current frame 104. This prediction can be performed using any suitable approach, such as a heuristic technique or an advanced deep learning technique, as described further throughout this disclosure. In this manner, the object detection 106 is performed in the compressed domain, as it simply uses motion vectors extracted from the compressed frame 104 rather than fully decompressing the compressed frame 104 into the pixel domain.

In this manner, pixel-domain object detection 105 is only performed intermittently or periodically on select reference frames 103 dispersed throughout the video stream 102 (e.g., beginning with the first frame), while compressed-domain object detection and tracking 106 is performed on all other frames 104 using their compressed-domain motion vectors and the object detection results 108*a,b* from preceding frames.

Moreover, while the compressed video stream 102 can be compressed using existing compression standards (e.g., H.264), a modified compression scheme can also be used to save both computation and bandwidth. In particular, while typical compression standards encode compressed video frames using both motion vectors and prediction residuals or errors (e.g., for motion compensation), compressed-domain object detection 106 can be performed using only the motion vectors associated with the compressed video frames. Accordingly, during compression of frames 104 that will be processed using compressed-domain object detection 106, computation and bandwidth can be saved by only performing motion estimation to encode motion vectors while skipping motion compensation and residue encoding. In this manner, frames 103 that will be processed using pixel-domain object detection 105 can be compressed and encoded as normal (e.g., with both motion vectors and prediction residuals), while frames 104 that will be processed using compressed-domain object detection 106 can be compressed and encoded to solely include motion vectors. Further, in some embodiments, frames may only be included in the compressed video stream 102 if they are determined to contain objects (e.g., based on a preliminary foreground detection/background subtraction technique).

Further, while this hybrid video analytics framework is primarily described in connection with object detection and tracking, it can similarly be used for other types of visual analytics and/or visual computing workloads. For example, other types of video analytics can similarly be implemented using a combination of pixel-domain and compressed-domain analytics on different frames of a video stream.

Additional functionality and embodiments are described further in connection with the remaining FIGURES. Accordingly, it should be appreciated that hybrid video analytics system 100 of FIG. 1 may be implemented with any aspects of the embodiments described throughout this disclosure.

FIG. 2 illustrates another example embodiment of a hybrid video analytics system 200. The functionality of hybrid video analytics system 200 is similar to that of hybrid video analytics system 100 from FIG. 1, except the pixel-domain object detection 205 is performed in the cloud 230 instead of on the edge node 220. This embodiment is particularly advantageous when pixel-domain object detection 205 is too computationally expensive to run on the camera 210 or edge node 220, such as when those devices are resource constrained and pixel-domain object detection 205 is implemented using state-of-the-art machine learning (ML), deep learning (DL), artificial intelligence (AI), and/or artificial neural network techniques (e.g., convolutional neural networks (CNNs)).

In hybrid video analytics system 200, for example, the camera 210 transmits the compressed video stream 202 to the edge node 220. The edge node 220 then transmits certain frames 203 in the video stream 202 to the cloud 230 to perform pixel-domain object detection 205, while the edge node 220 performs compressed-domain object detection 206 on the remaining frames 204.

For example, the edge node 220 transmits periodic reference frames 203 in the compressed video stream 202 to the cloud 230. The cloud 230 then decompresses each periodic reference frame 203, performs pixel-domain object detection 205 on the decompressed or raw frame pixels, and then transmits the object detection result 208*a* for each frame 203 back to the edge node 220.

The edge node 220 then performs compressed-domain object detection 206 on the remaining frames 204 in the compressed video stream 202. For example, the edge node 220 may perform compressed-domain object detection 206 on each remaining frame 204 using the compressed-domain motion vectors from that frame 204 and the object detection result 208*a,b* from the preceding frame (which may have been obtained in either the pixel or compressed domain).

Figure 3A:
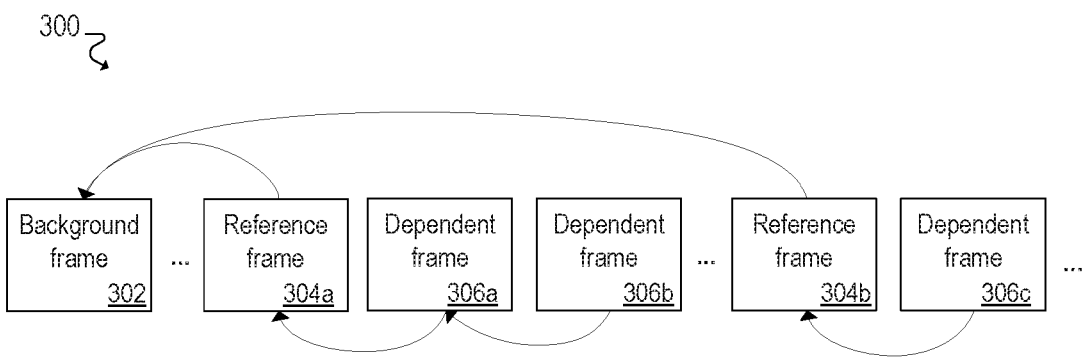
FIGS. 3A-B illustrate an example of compressing and processing a video stream using a hybrid video analytics framework.
Figure 3B:
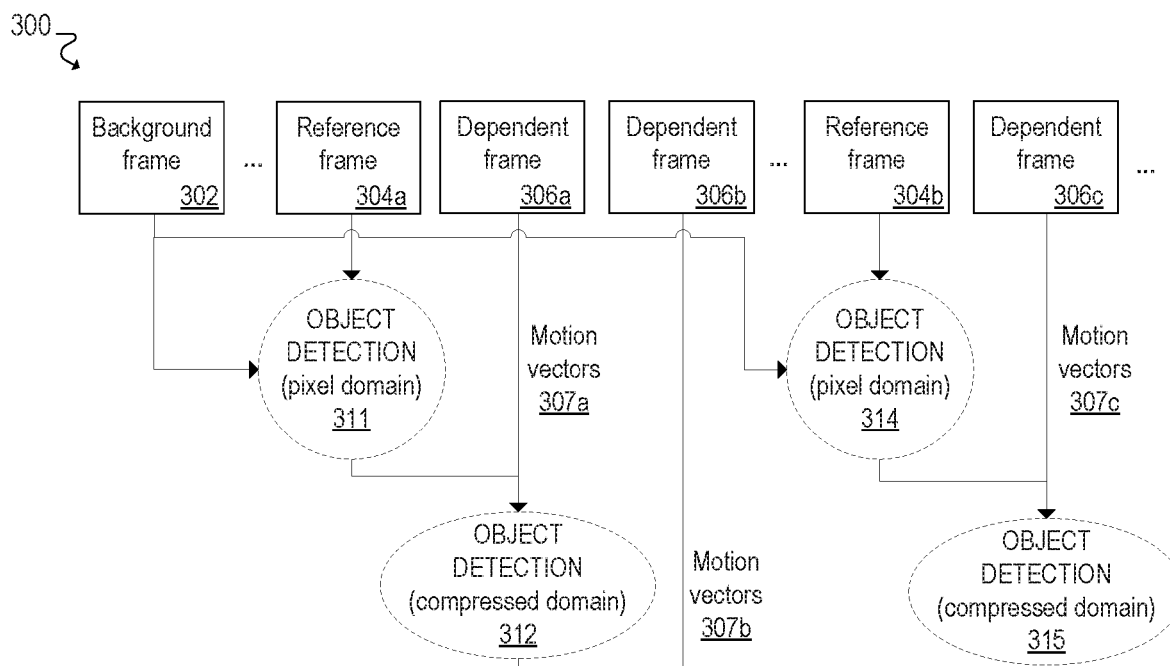

FIGS. 3A-B illustrate an example of compressing and processing a video stream 300 using a hybrid video analytics framework. In particular, FIG. 3A illustrates an example of compressing the video stream 300, while FIG. 3B illustrates an example of processing the video stream 300 using hybrid video analytics.

In FIG. 3A, for example, the video stream 300 includes an initial background frame 302 followed by sequences of references frames 304*a,b* and dependent frames 306*a-c*. The background frame 302 contains an image captured by a camera without any foreground objects present in the camera view. In some embodiments, the background frame 302 may be compressed as an intra-coded frame (I-frame), while subsequent reference frames 304*a,b* may be compressed as predicted frames (P-frames), which are predicted from the background frame 302. In this manner, the background frame 302 enables pixel-domain object detection to be performed on subsequent reference frames 304*a,b* using a simple foreground extraction/background subtraction technique.

The reference frames 304*a,b* are compressed video frames dispersed intermittently throughout the video stream 300 that will ultimately be processed using pixel-domain object detection. In some embodiments, the reference frames 304*a,b* may be P-frames that are predicted from the background frame 302. In other embodiments, however, the background frame 302 may be omitted, and the reference frames 304a,b may be compressed as I-frames, or as P-frames that are predicted from another preceding frame.

The reference frames 304a,b are dispersed intermittently throughout the video stream 300 so that pixel-domain object detection is only periodically or intermittently performed from scratch. In some embodiments, for example, certain frames in the video stream 300 may be periodically selected as reference frames 304a,b (e.g., based on a time interval or a particular number of frames). Alternatively, in some embodiments (e.g., when the background frame 302 is not used), frames that are encoded as I-frames in the video stream 300 may be treated as reference frames 304a,b.

In this manner, pixel-domain object detection will be periodically or intermittently performed on these reference frames 304a,b. In particular, pixel-domain object detection is computationally expensive but provides better accuracy than compressed-domain object detection. Thus, pixel-domain object detection is performed occasionally only on the reference frames 304a,b, while compressed-domain object detection is performed on the remaining dependent frames 306a-c. In this manner, the overall computation requirements are reduced by relying primarily on compressed-domain object detection, while the errors that accumulate from repeatedly performing compressed-domain object detection are intermittently reset whenever pixel-domain object detection is performed.

The dependent frames 306a-c are compressed video frames that are predicted from a preceding frame and will ultimately be processed using compressed-domain object detection. For example, each dependent frame 306a-c may be compressed or predicted either from a preceding reference frame 304a,b or from another preceding dependent frame 306a-c. In the illustrated example, dependent frame 306a is predicted from reference frame 304a, dependent frame 306b is predicted from dependent frame 306a, and dependent frame 306c is predicted from reference frame 304b.

In some embodiments, the dependent frames 306a-c may be compressed as fully encoded P-frames that include both the motion vectors and prediction residuals required to fully decode them from the corresponding preceding frames from which they are predicted.

In other embodiments, however, the dependent frames 306a-c may be compressed as partially encoded frames, referred to as "motion-predicted" frames (MP-frames), which only include the motion vectors and do not include the prediction residuals. In particular, compressed-domain object detection can be performed on a compressed frame using only its motion vectors—the compressed frame does not need to be fully decoded using prediction residuals. As a result, prediction residuals are unnecessary and can be omitted from dependent frames 306a-c since those frames will be processed using compressed-domain object detection. Thus, in some embodiments, the dependent frames 306a-c may be compressed as motion-predicted frames (MP-frames). For example, a motion-predicted frame (MP-frame) may be compressed by performing motion estimation to generate and encode the motion vectors, while skipping motion compensation and residue encoding. This approach saves both computation and bandwidth. In particular, the computation required to compress and decompress the dependent frames 306a-c is reduced, as compression simply involves generating and encoding the motion vectors, while decompression simply involves decoding or extracting the motion vectors. The resulting size of the dependent frames 306a-c is also reduced, which consequently reduces the bandwidth required to transmit those frames.

In FIG. 3B, object detection and tracking is performed on the compressed video stream 300 using hybrid video analytics in both the pixel domain and the compressed domain. In particular, object detection and tracking is performed by relying primarily on compressed-domain analytics and only periodically or intermittently leveraging pixel-domain analytics.

In the illustrated example, the first frame in the video stream 300 (aside from the background frame 302) is a reference frame 304a, which will be processed using pixel-domain object detection 311. For example, reference frame 304a is first decompressed or decoded into the pixel domain. Since reference frame 304a was compressed or predicted from the background frame 302, decompressing and decoding reference frame 304a requires both the reference frame 304a itself and the background frame 302. Once reference frame 304a has been decompressed into the pixel domain, pixel-domain object detection 311 can then be performed on the raw or decompressed frame. Pixel-domain object detection can be performed using any suitable object detection technique that operates in the pixel domain (e.g., on raw visual data or pixels), from a simple foreground detection/background subtraction technique to an advanced deep learning technique (e.g., a CNN trained for object detection). In some embodiments, for example, the result of the object detection may be a bounding box bitmap that identifies which pixels in the frame are occupied by object(s).

The next frame in the video stream 300 is a dependent frame 306a, which will be processed using compressed-domain object detection 312. For example, compressed-domain object detection 312 is performed on dependent frame 306a using its compression motion vectors along with the object detection result for the preceding frame that it was compressed or predicted from. Thus, the motion vectors 307a are first decoded and extracted from dependent frame 306a. Moreover, because dependent frame 306a was predicted from reference frame 304a, the object detection result 311 for reference frame 304a will also be used. In some embodiments, for example, compressed-domain object detection 312 may use the object bounding boxes 311 from reference frame 304a and the motion vectors 307a from dependent frame 306a to predict where the object bounding boxes are located in dependent frame 306a. This prediction can be performed using any suitable approach, such as a heuristic technique or an advanced deep learning technique, as described further throughout this disclosure.

The next frame in the video stream 300 is another dependent frame 306b, which will be processed using compressed-domain object detection 313. For example, because dependent frame 306b was predicted from dependent frame 306a, the object bounding boxes 312 from dependent frame 306a are used in conjunction with the motion vectors 307b from dependent frame 306b to predict where the object bounding boxes are located in dependent frame 306b.

The next frame in the video stream 300 is a new reference frame 304b, which will be processed using pixel-domain object detection 314. For example, reference frame 304b is first decompressed or decoded into the pixel domain (e.g., using the reference frame itself 304b and the background frame 302 that it was compressed or predicted from). Once reference frame 304b has been decompressed into the pixel domain, pixel-domain object detection 314 is then performed on the raw or decompressed frame.

The final frame in the video stream 300 is another dependent frame 306c, which will be processed using compressed-domain object detection 315. For example, because dependent frame 306c was predicted from reference frame 304b, the object bounding boxes 314 from reference frame 304b are used in conjunction with the motion vectors 307c from dependent frame 306c to predict where the object bounding boxes are located in dependent frame 306c.

Compressed-Domain Object Detection and Tracking

As described above, performing pixel-domain object detection from scratch on every frame of a video stream is computationally expensive. Thus, the hybrid video analytics framework described above implements object detection and tracking by performing pixel-domain object detection intermittently on certain frames dispersed throughout a video stream, while relying on compressed-domain object detection for all other frames.

In particular, compressed-domain object detection is leveraged to analyze certain compressed video frames directly in the compressed domain, without decompressing and decoding them into the pixel domain. For example, the motion vectors encoded in the bitstream of a compressed video frame can be used in conjunction with the object detection result from the previous frame (e.g., the object bounding boxes detected for the previous frame) to predict the location of objects in the compressed frame. In this manner, object detection and tracking can be performed on a compressed frame without decompressing and decoding the frame into the pixel domain, thus avoiding the need to perform the inverse transformation and motion compensation that are typically required for decompression. As a result, the amount of computation required to decode the video is significantly reduced.

In various embodiments, compressed-domain object detection can be implemented using a variety of different techniques, from heuristic techniques (e.g., FIG. 4) to advanced deep learning techniques (e.g., FIGS. 5A-B), as explained further below.

Figure 4:
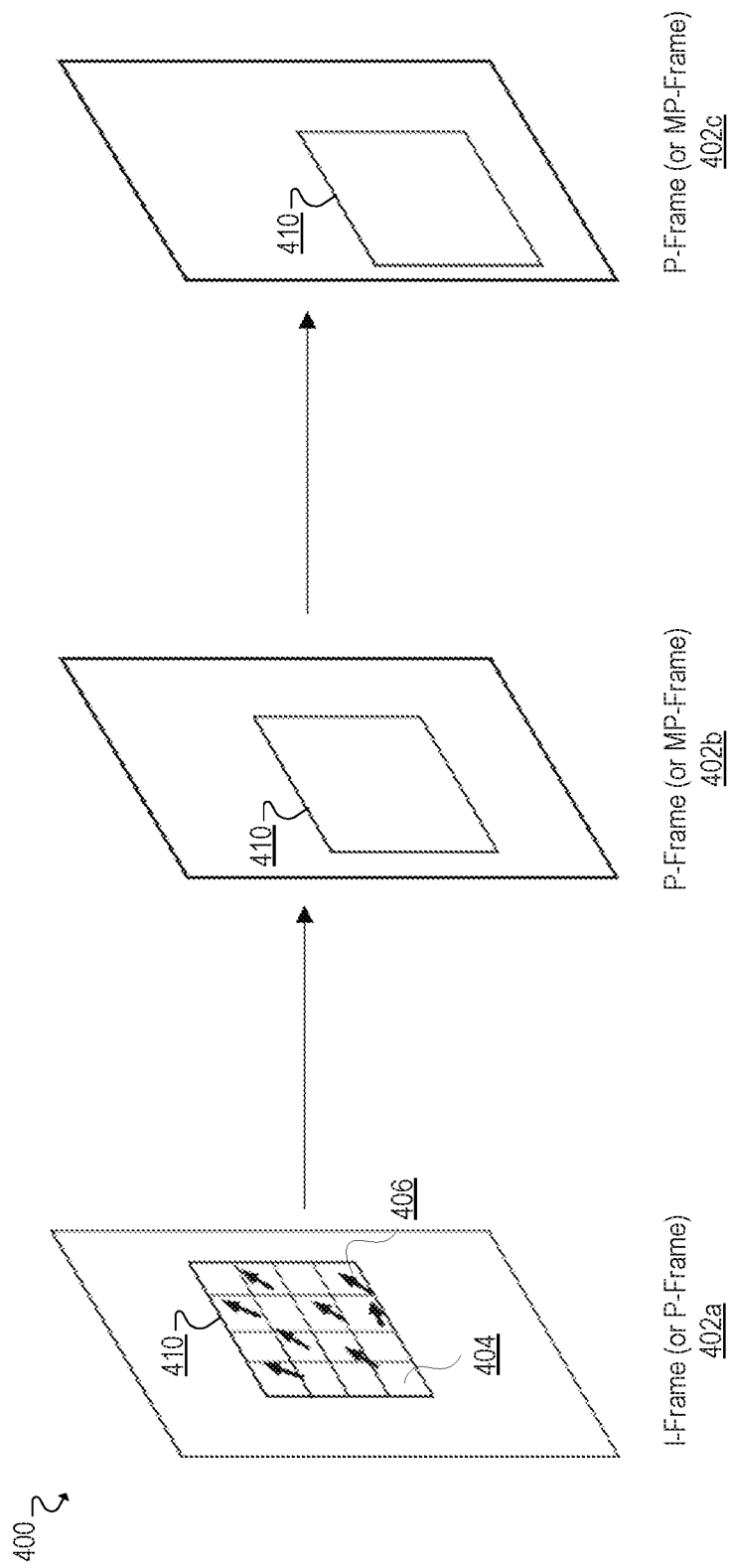
FIG. 4 illustrates an example of compressed-domain object detection using a heuristic technique.

FIG. 4 illustrates an example of compressed-domain object tracking using a heuristic technique. In the illustrated example, object detection and tracking is performed on a compressed video stream 400 with three frames 402a-c using hybrid video analytics. For example, objects are initially detected by analyzing the first frame 402a in the pixel domain, and the objects are subsequently tracked by analyzing the remaining frames 402b,c in the compressed domain. In particular, the positions of the objects in the first frame 402a are used in conjunction with the motion vectors encoded in the remaining frames 402b,c to heuristically predict where the objects are located in the remaining frames 402b,c, as explained below.

In the illustrated example, an object 410 is initially detected in the first frame 402a using pixel-domain analytics. For example, the first frame 402a is either compressed as an intra-coded frame (I-frame) or a predicted frame (P-frame). Thus, the frame 402a is first decompressed or reconstructed from the compressed domain into the pixel domain, and object detection is then performed on the decompressed frame by analyzing the underlying pixels (e.g., using a pixel-domain object detection CNN).

The position of the object 410 in the second frame 402b is then determined using compressed-domain analytics. For example, the second frame 402b is compressed as either a predicted frame (P-frame) or a motion-predicted frame (MP-frame) that is predicted from the first frame 402a.

In particular, P-frame encoding is used to compress a raw video frame with reference to another similar video frame, or reference frame. The raw video frame is partitioned into macroblocks, and each macroblock is either intra-coded (e.g., compressed by itself) or inter-coded (e.g., compressed with reference to a similar block in the reference frame). For example, an inter-coded macroblock is encoded with reference to a similar block in the reference frame using a motion vector and a prediction residual. The motion vector points to the position of the similar block in the reference frame relative to the position of the inter-coded macroblock. Moreover, the prediction residual encodes the difference between the inter-coded macroblock and the similar block in the reference frame. In this manner, the inter-coded macroblock can subsequently be "decompressed" by reconstructing its raw pixels from the reference frame using the motion vector and the prediction residual.

Alternatively, a motion-predicted frame (MP-frame) is only encoded with motion vectors and not the prediction residuals. This is because an MP-frame is used exclusively for compressed-domain analytics and does not need to be decompressed into the pixel domain, thus the prediction residuals are unnecessary.

In the illustrated example, the motion vectors encoded in the second frame 402b are used in conjunction with the position of the object 410 in the first frame 402a to heuristically estimate the position of the object 410 in the second frame 402b. For example, the position of the object 410 in the first frame 402a spans a collection of macroblocks 404 at certain positions within the first frame 402a. Accordingly, the motion vectors 406 for macroblocks at corresponding positions within the second frame 402b are extracted or decoded from the second frame 402b. For illustration purposes, the motion vectors 406 extracted from the second frame 402b are superimposed on the corresponding macroblocks 404 in the first frame 402a in FIG. 4. An average motion vector is then derived from the decoded motion vectors 406 by computing the average of the non-zero motion vectors. The position of the object 410 in the second frame 402b is then estimated based on this average motion vector and the position of the object 410 in the first frame 402a.

The position of the object 410 in the third frame 402c is determined using compressed-domain analytics in a similar manner as described for the second frame 402b.

Figure 5A:
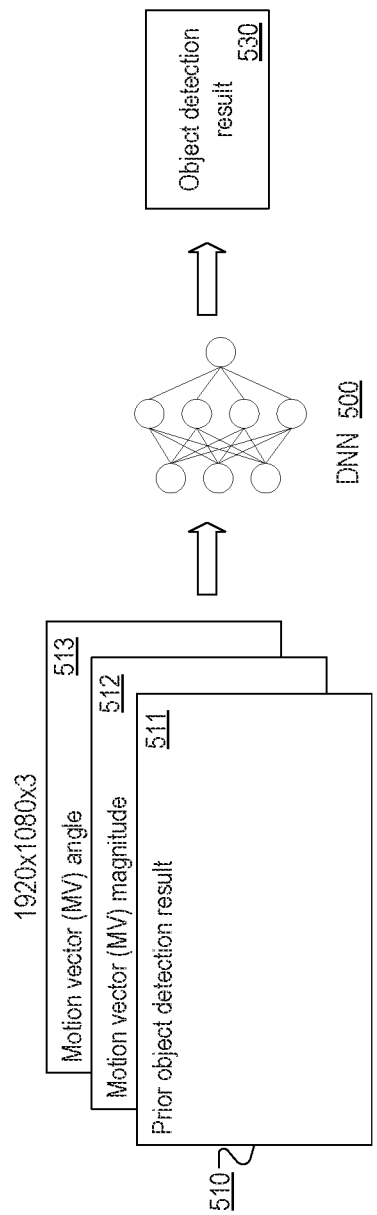
FIGS. 5A-B illustrate examples of compressed-domain object detection using a deep neural network (DNN).
Figure 5B:
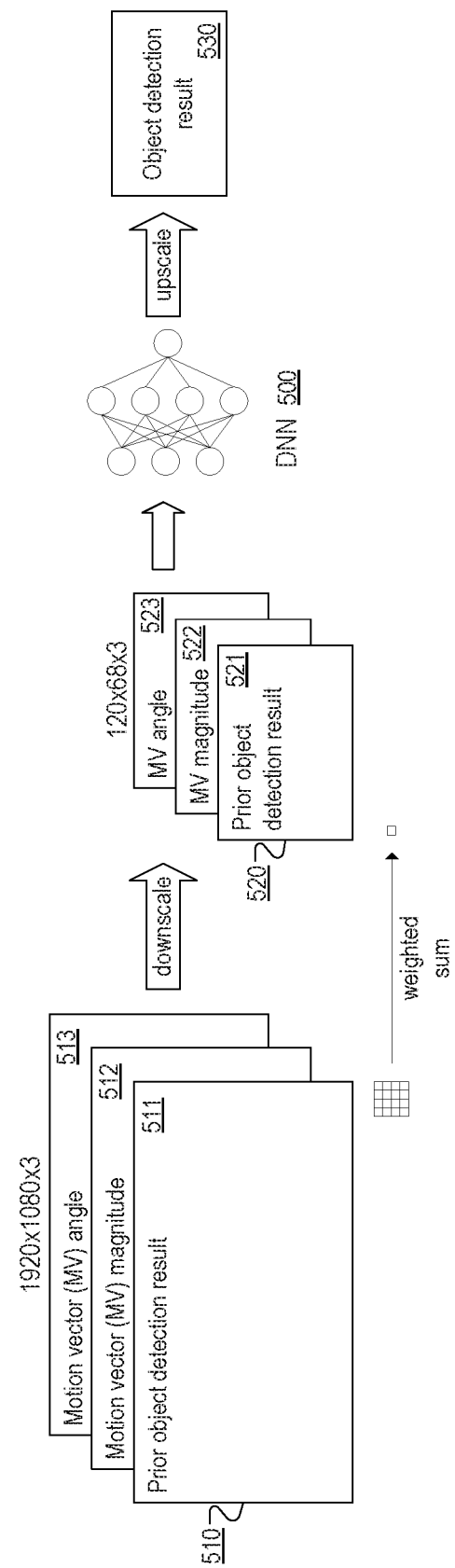

FIGS. 5A-B illustrate examples of compressed-domain object detection using a deep neural network (DNN). In some embodiments, for example, a deep neural network (DNN) may be leveraged to perform object detection and tracking in the compressed domain using a novel representation of compressed video frames as input, which does not require full decompression of the video bitstream. While this compressed-domain input achieves similar DNN object detection performance compared to traditional pixel-domain input, it also reduces computation and bandwidth, as the compressed video frame only needs to be partially compressed and encoded when transmitting the video stream, and only partially decoded when performing the visual analytics workload.

In some embodiments, for example, compressed-domain object detection may be performed as follows:
 (1) Obtain the object bounding boxes for the preceding frame;
 (2) Obtain the encoded motion vectors for the current frame; and
 (3) Perform object detection and tracking on the current frame by feeding the object bounding boxes and motion vectors as input to a DNN.

With respect to the first step, there are many ways to get the object bounding boxes for the preceding frame. For example, the object bounding boxes for the preceding frame may have been computed using pixel-domain object detection, compressed-domain object tracking (e.g., based on the motion vectors from the preceding frame and the object bounding boxes from the frame before that), and so forth.

With respect to the second step, obtaining the encoded motion vectors for the current frame is straightforward in any video codec. The decoder simply needs to perform bitstream parsing, entropy decoding, and invest motion vector prediction—invest transformation and motion compensation do not need to be performed. On a software decoder, this can save approximately ⅔rds to ¾ths of the decoding computation. On a hardware decoder, the decoder streamout in the media engine will include the motion vector information.

With respect to the third step, a novel format is used to represent the object bounding boxes and encoded motion vectors that are supplied as input to the DNN. Using this novel representation as input, the DNN then performs object detection and tracking on the current frame.

This solution provides numerous advantages. For example, image and video do not need to be fully decompressed before a DNN can be used to analyze their contents. Moreover, this solution is compatible with any state-of-the-art neural network, as the novel input format used by the DNN does not require any modification of the neural network structure or implementation. Further, because the novel input format can be represented using a lower resolution than pixel-domain input, the neural network complexity can also be reduced.

Figure 6:
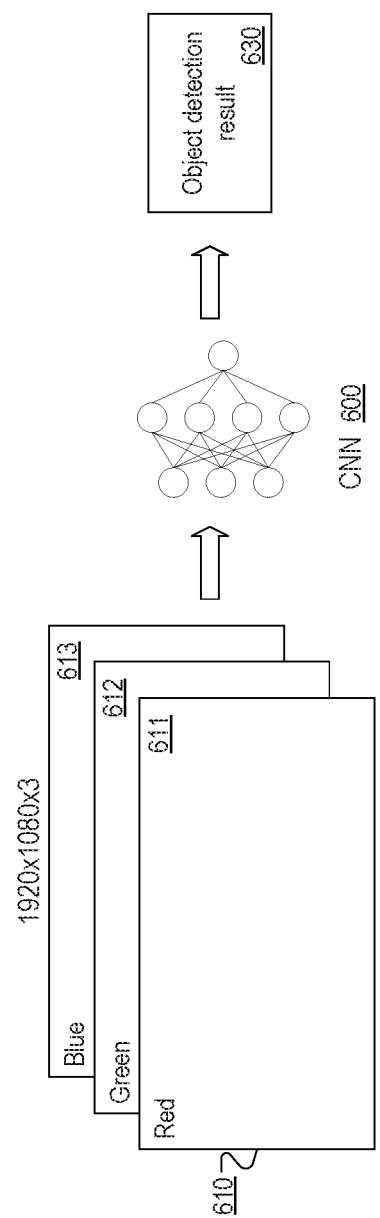
FIG. 6 illustrates an example of pixel-domain object detection using a convolutional neural network (CNN).

By way of comparison, FIGS. 5A-B illustrate a deep neural network (DNN) 500 that performs object detection in the compressed domain, while FIG. 6 illustrates a convolutional neural network (CNN) 600 that performs object detection in the pixel domain.

In FIG. 6, for example, the convolutional neural network (CNN) 600 performs object detection in the pixel domain using raw visual data 610 as input. The raw visual data 610 is typically represented as a block of pixels having a particular size or resolution (e.g., 1920×1080 pixels), which is further arranged into three channels that respectively contain the red 611, green 612, and blue 612 (RGB) color values for each pixel (e.g., 1920×1080×3). The CNN 600 performs object detection on this raw visual data 610 and then outputs a result 630 indicating whether any objects were detected.

In FIGS. 5A-B, on the other hand, the deep neural network (DNN) 500 performs object detection in the compressed domain using a novel representation of compressed-domain data 510 as input. For example, as explained above, object detection can be performed on a compressed video frame using the motion vectors encoded in the compressed frame along with the object bounding boxes detected in a preceding frame. Thus, in the illustrated example, the motion vectors encoded in a compressed frame and the object bounding boxes detected in a preceding frame are supplied as input 510 to the DNN 500.

Moreover, in order to minimize and/or avoid changes to the underlying DNN design, this compressed-domain input 510 is organized into three channels 511, 513, and 513, similar to the pixel-domain input of a traditional CNN (e.g., as shown in FIG. 6). For example, the input 510 includes one channel 511 corresponding to the objects that were detected in the preceding frame and two channels 512, 513 corresponding to the motion vectors that are encoded in the current compressed frame. In particular, the first channel 511 contains the object bounding boxes for objects that were detected in the preceding frame, the second channel 512 contains the magnitudes of motion vectors encoded in the compressed frame, and the third channel 513 contains the angles of motion vectors encoded in the compressed frame.

In some embodiments, for example, the channel 511 corresponding to the prior object detection result may be represented as a bounding box bitmap that identifies which pixels in the frame are occupied by object(s). For example, each value in the bounding box bitmap 511 may correspond to a pixel location in the video frame, where a value of 0 indicates there is no object on the corresponding pixel and a value of 1 (or 255) indicates there is an object on the corresponding pixel.

In another embodiment, the bounding box bitmap 511 is extended using continuous values to represent the probabilities of objects being on the corresponding pixels. For example, a value of 0.5 (or 128) indicates that there is 50% chance of an object being on the corresponding pixel. Note that most object detection neural networks will output not only the bounding boxes of the objects, but also the probabilities.

In another embodiment, each value in the bounding box bitmap 511 indicates the probability of an object being within a corresponding block of pixels (e.g., 8×8 or 16×16) in the frame rather than on a single pixel (e.g., such as a macroblock of pixels used for compression purposes). In this embodiment, the resolution of the bounding box channel 511 and the motion vector channels 512, 513 can be reduced to a per-block basis rather than a per-pixel basis (e.g., as shown in FIG. 5B).

In another embodiment, the bounding box bitmap 511 may account for the possibility of more than one object being detected on a corresponding pixel or block of pixels. For example, the probability corresponding to each block of pixels may be defined as the sum of weighted probabilities for each object bounding box detected within the block of pixels.

In various embodiments, motion vectors can be represented based on their magnitude and angle values (magnitude, angle) or based on their horizontal and vertical components (x, y). Using either representation, separate channels 512, 513 are used for the respective components of the motion vector representation (e.g., a magnitude channel and an angle channel, or a horizontal (x) channel and a vertical (y) channel). In the illustrated embodiment, for example, motion vectors are represented using their magnitude and angle values (magnitude, angle). Thus, one channel 512 contains the magnitude values of the motion vectors, and another channel 513 contains the angle values of the motion vectors.

In various embodiments, the motion vector channels 512, 513 may represent motion vectors on either a per-pixel or a per-block basis to match the resolution of the object bounding box channel 511 (e.g., which may also be represented on a per-pixel or per-block basis). Representing the object bounding box 511 and motion vector 512, 513 channels on a per-block basis rather than a per-pixel basis can reduce the amount of computation, but it may also reduce the accuracy.

In some embodiments, linear interpolation may be used to populate values in the motion vector channels 512, 513 that correspond to blocks in the compressed frame that do not have motion vectors. In some cases, for example, the compressed frame may not include motion vectors for certain blocks of pixels. In particular, not all macroblocks in the compressed frame will be inter-coded or predicted from other macroblocks—occasionally, certain macroblocks will be skipped or intra-coded and thus will not have motion vectors. For example, because an intra-coded macroblock is not predicted from another macroblock, the intra-coded macroblock is not encoded with motion compensation and thus has no corresponding motion vector. Thus, for macroblocks that do not have motion vectors (e.g., blocks that are not inter-coded), linear interpolation may be used to populate the corresponding values in the motion vector channels 512, 513 for those macroblocks based on the motion vectors from their neighboring blocks.

In some embodiments, macroblocks with special conditions—such as zero-motion blocks (e.g., with motion vectors of zero), skip blocks, or intra-coded blocks—may be represented using special codes that are encoded in a reserved section of the motion vector space (e.g., within motion vector channels 512, 513).

In this manner, the bounding box information from the previous frame and the motion vectors in the current frame are encoded into a three-channel input 510: the first channel 511 contains a probability map of object bounding boxes for the previous frame; the second channel 512 contains the magnitudes of motion vectors in the current frame; and the third channel 513 contains the angles of motion vectors in the current frame. In addition, macroblocks with special conditions (e.g., zero-motion blocks, skip blocks, intra-coded blocks) may be separately encoded or identified in the input 510.

In FIG. 5A, the three-channel input 510 is represented at a per-pixel resolution rather than a per-block resolution. This input 510 is fed into the DNN 500, and the DNN 500 analyzes the input 510 and then outputs an object detection result 530 for the current frame. In some embodiments, for example, the object detection result 530 may include an object bounding box probability map for the current frame.

In FIG. 5B, the three-channel input 510 is downscaled from the per-pixel resolution (e.g., 1920×1080×3) into a lower-resolution input 520 with a per-block resolution (e.g., 120×68×3). For example, the lower-resolution input 520 still contains the same three channels (e.g., the object bounding box channel 521, motion vector magnitude channel 522, and motion vector angle channel 523), but the underlying values in the channels each correspond to a block of frame pixels rather than a single frame pixel. This lower-resolution input 520 is then fed into the DNN 500, and the DNN 500 analyzes the input 520 and then outputs the object detection result 530 for the current frame. In some embodiments, the object detection result 530 may be upscaled back to its original resolution.

Figure 7:
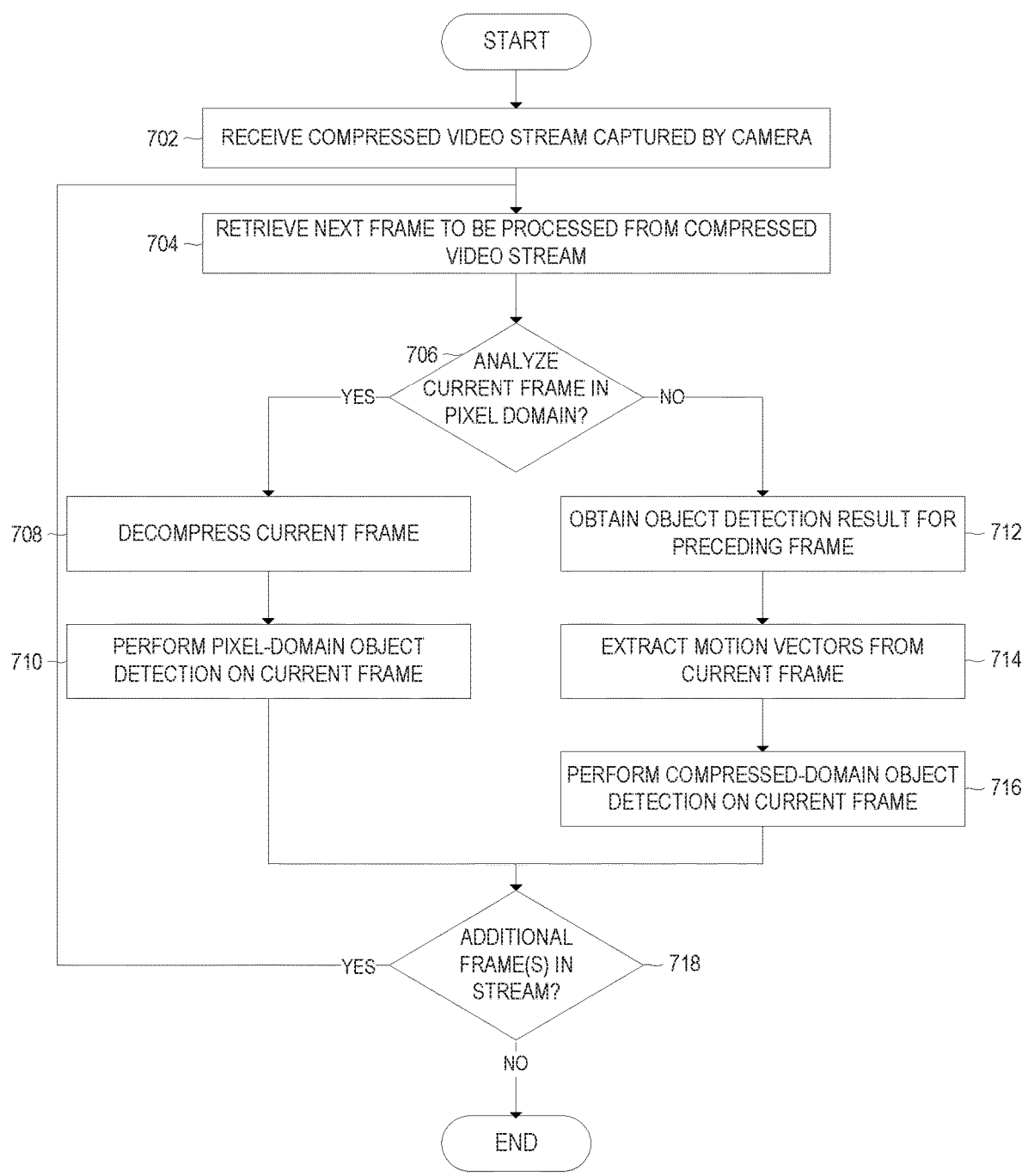
FIG. 7 illustrates a flowchart for an example embodiment of object detection and tracking using a hybrid video analytics framework.

FIG. 7 illustrates a flowchart 700 for an example embodiment of object detection and tracking using a hybrid pixel-domain and compressed-domain video analytics framework. In some cases, for example, flowchart 700 may be implemented by a hybrid video analytics system (e.g., hybrid video analytics system 100 of FIG. 1 and/or hybrid video analytics system 200 of FIG. 2).

The flowchart begins at block 702 to receive a compressed video stream captured by a camera. The compressed video stream may include a plurality of compressed video frames, such as intra-coded frames (I-frames), predicted frames (P-frames), motion-predicted frames (MP-frames), and/or bidirectional predicted frames (B-frames). For example, each compressed video frame may either be compressed by itself (e.g., an I-frame) or compressed based on one or more other similar frames (e.g., a P-frame, MP-frame, or B-frame). Moreover, in some embodiments, the compressed video stream may also include a background frame (e.g., a background I-frame) to facilitate video analytics.

The flowchart then proceeds to block 704 to retrieve the next frame to be processed from the compressed video stream. In some embodiments, for example, each frame in the compressed video stream is processed separately (e.g., either in the pixel domain or the compressed domain).

The flowchart then proceeds to block 706 to determine whether to analyze the current frame in the pixel domain or the compressed domain. In particular, only certain frames dispersed throughout the video stream are analyzed in the pixel domain, while all remaining frames are analyzed in the compressed domain. For example, certain frames in the video stream may be analyzed in the pixel domain on a periodic basis (e.g., based on a particular time interval or a number of frames), while the remaining frames may be analyzed in the compressed domain. Alternatively, or additionally, frames may be analyzed in the pixel domain if they are independently compressed or encoded (e.g., I-frames), while the remaining frames (e.g., P-frames, MP-frames, B-frames) may be analyzed in the compressed domain. Alternatively, or additionally, frames may be analyzed in the pixel domain if they are compressed or predicted directly from a background frame (e.g., P-frames predicted from a background I-frame), while the remaining frames may be analyzed in the compressed domain (e.g., P-frames, B-frames, and/or MP-frames that are predicted from other non-background frames).

If it is determined at block 706 that the current frame should be analyzed in the pixel domain, the flowchart proceeds to block 708 to decompress the current frame into the pixel domain, and then to block 710 to perform pixel-domain object detection on the decompressed frame. In some embodiments, for example, pixel-domain object detection may be performed using a foreground detection/background subtraction technique, such as by detecting objects in the current decompressed frame based on the frame difference between the decompressed frame and a background frame. Alternatively, or additionally, pixel-domain object detection may be performed by processing the decompressed frame using a convolutional neural network (CNN) that is trained to perform object detection in the pixel domain. Moreover, based on the pixel-domain object detection, one or more objects may be detected at respective positions in the decompressed frame.

If it is determined at block 706 that the current frame should be analyzed in the compressed domain, the flowchart proceeds to block 712 to obtain the object detection result for a preceding frame. In particular, the current frame may be compressed or predicted based on a preceding frame that has already been processed using object detection (e.g., either in the pixel domain or the compressed domain). Further, based on the object detection performed on the preceding frame, one or more objects may have been detected at certain positions within the preceding frame. Moreover, the positions of objects detected within the preceding frame can be used in conjunction with the motion vectors encoded in the current frame to detect or track the positions of those objects in the current frame. Accordingly, the object detection result for the preceding frame is retrieved at block 706.

The flowchart then proceeds to block 714 to extract motion vectors from current frame. In particular, when the current frame was compressed, it may have been encoded with motion vectors and/or prediction residuals. As noted above, the motion vectors can be used to predict the positions of objects in the current frame. Accordingly, the motion vectors are decoded and/or extracted from the current frame at block 714.

The flowchart then proceeds to block 716 to perform compressed-domain object detection on the current frame.

As noted above, compressed-domain object detection can be performed by using the positions of objects detected within the preceding frame in conjunction with the motion vectors encoded in the current frame to detect or track the positions of those objects in the current frame.

In some embodiments, for example, compressed-domain object detection may be implemented heuristically by computing the average motion vector for macroblocks in the current frame that are co-located with macroblocks in the preceding frame where an object was detected. For example, a subset of motion vectors may be identified for macroblocks of the current frame that are located in the same position as macroblocks in the preceding frame that correspond to the position of the object in the preceding frame. An average motion vector may then be computed based on this subset of motion vectors. The position of the object in the current frame may then be estimated based on the position of the object in the preceding frame and the average motion vector.

Alternatively, or additionally, compressed-domain object detection may be implemented using an artificial neural network (e.g., a DNN or CNN). In some embodiments, for example, a compressed-domain input with three channels may be generated for the neural network. For example, the first channel may include object bounding box information indicating the position of objects in the preceding frame, the second channel may include magnitude information for the motion vectors in the current frame, and the third channel may include angle information for the motion vectors in the current frame. The compressed-domain input may then be processed using the artificial neural network, which may be trained to perform object detection based on the three-channel compressed-domain input.

Moreover, based on performing compressed-domain object detection, the objects detected in the preceding frame may be detected at new positions in the current compressed frame.

The flowchart then proceeds to block 718 to determine whether there are additional frames to process in the compressed video stream. If there are additional frames to process, the flowchart proceeds back to block 704 to retrieve the next frame to be processed from the compressed video stream. If there are no additional frames to be processed, the processing of the compressed video stream may be complete.

At this point, the flowchart may be complete. In some embodiments, however, the flowchart may restart and/or certain blocks may be repeated. For example, in some embodiments, the flowchart may restart at block 702 to continue receiving and processing compressed video streams.

Example Internet-of-Things (IoT) Implementations

FIGS. 8-11 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
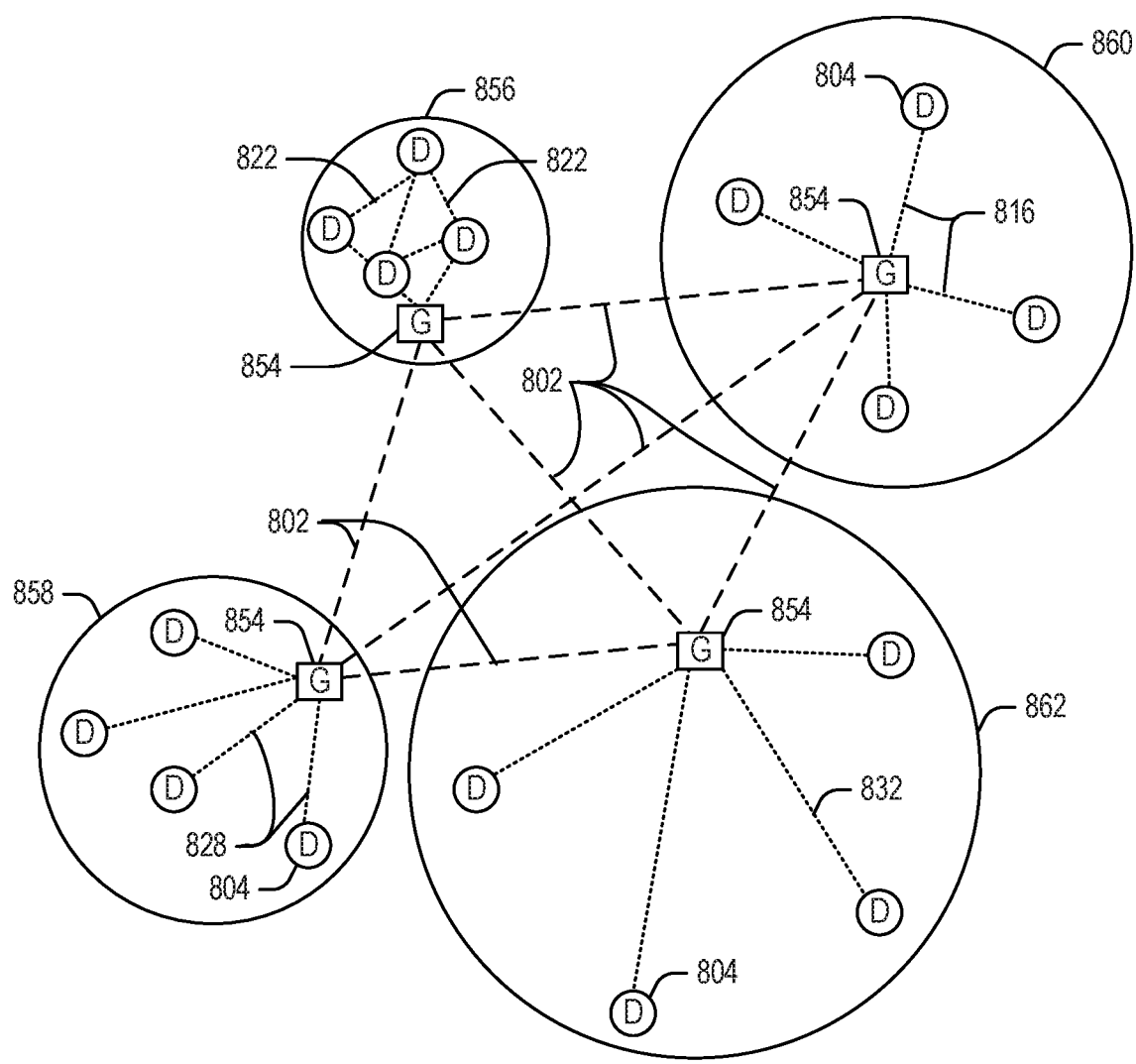
FIGS. 8, 9, 10, and 11 illustrate examples of Internet-of-Things (IoT) networks and architectures that can be used in accordance with certain embodiments.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8-11, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

Figure 9:
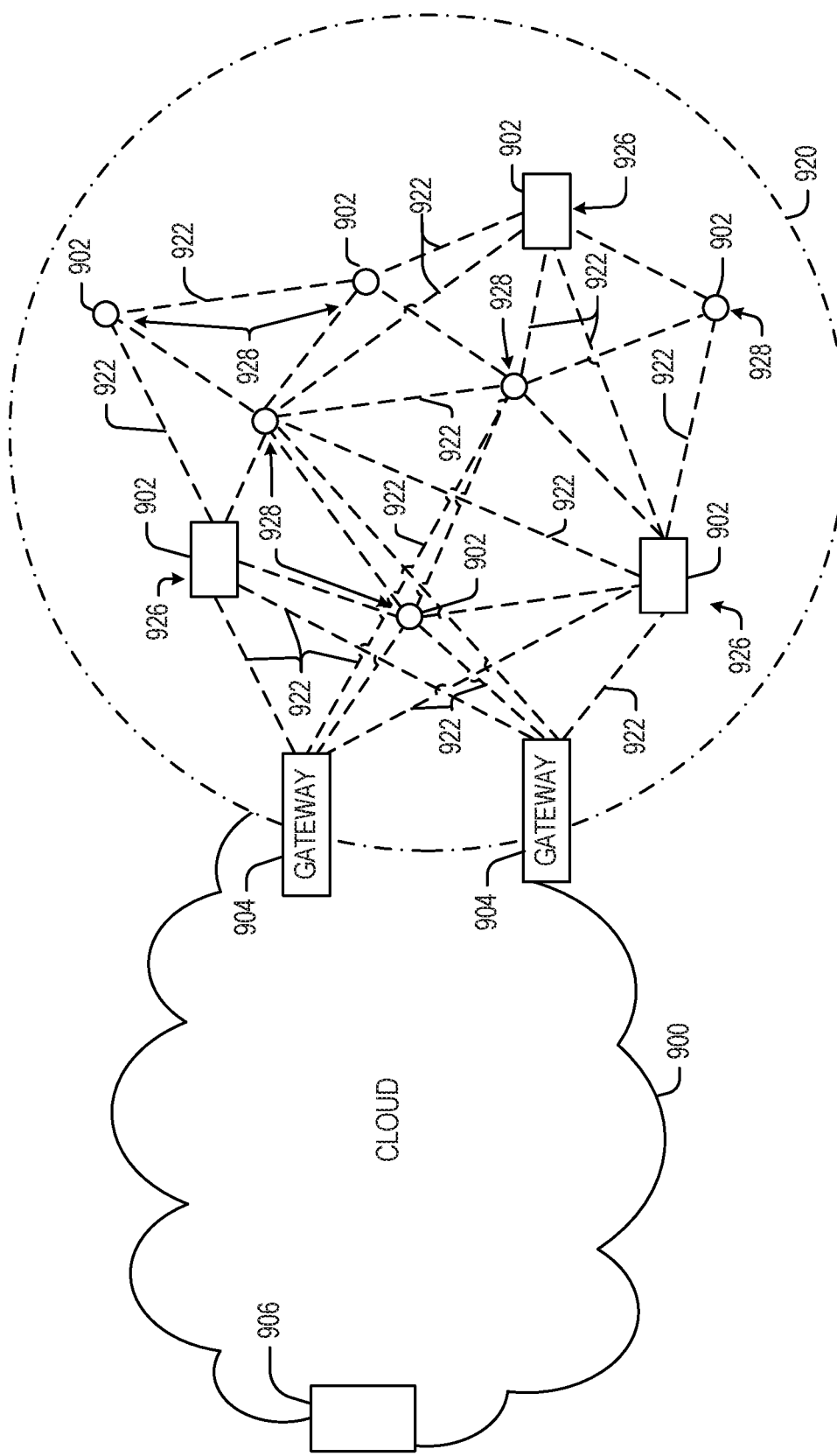

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

Figure 10:
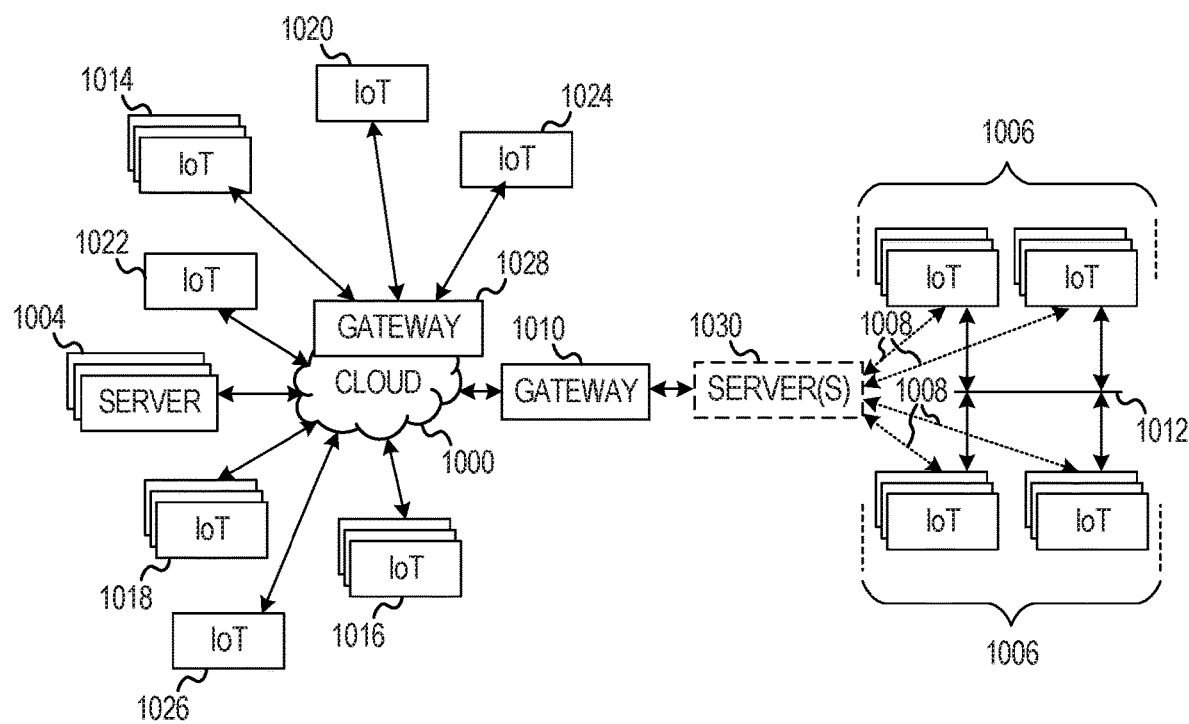

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
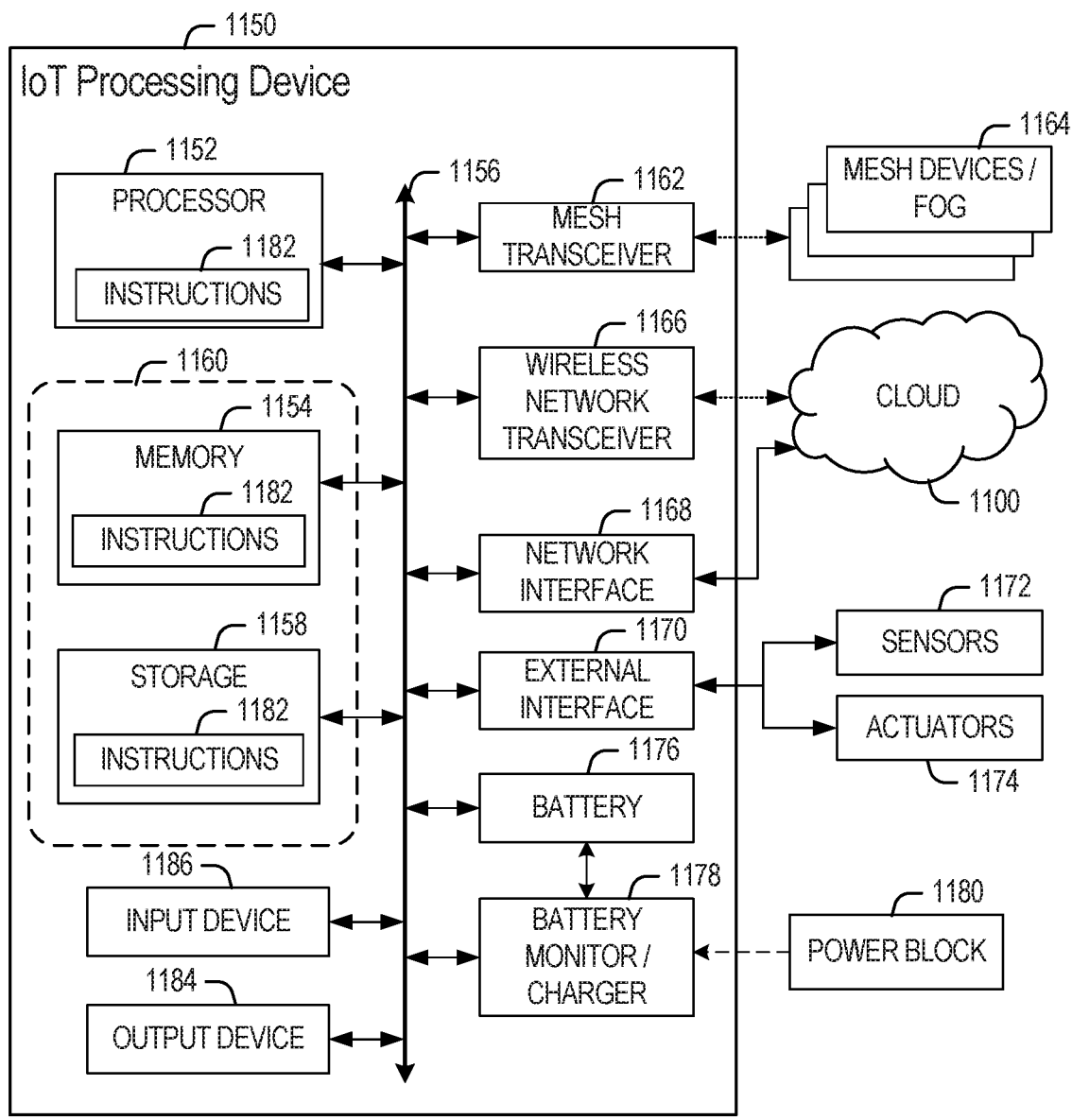

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G)

communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may include storage units such as optical disks, flash drives, or any number of other hardware devices. The non-transitory, machine readable medium 1160 may include instructions 1182 to direct the processor 1152 to perform a specific sequence or flow of actions, for example, as described with respect to the flowchart(s) and diagram(s) of operations and functionality described throughout this disclosure.

Example Computing Architectures

Figure 12:
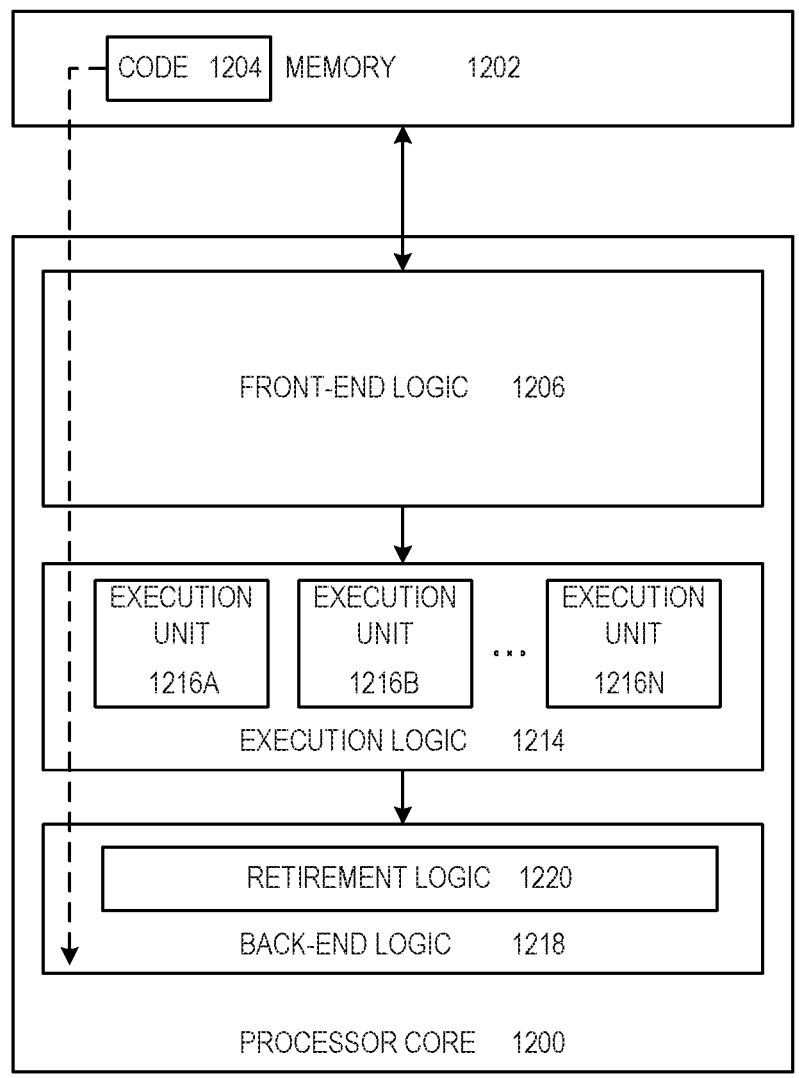
FIGS. 12 and 13 illustrate example computer architectures that can be used in accordance with certain embodiments.
Figure 13:
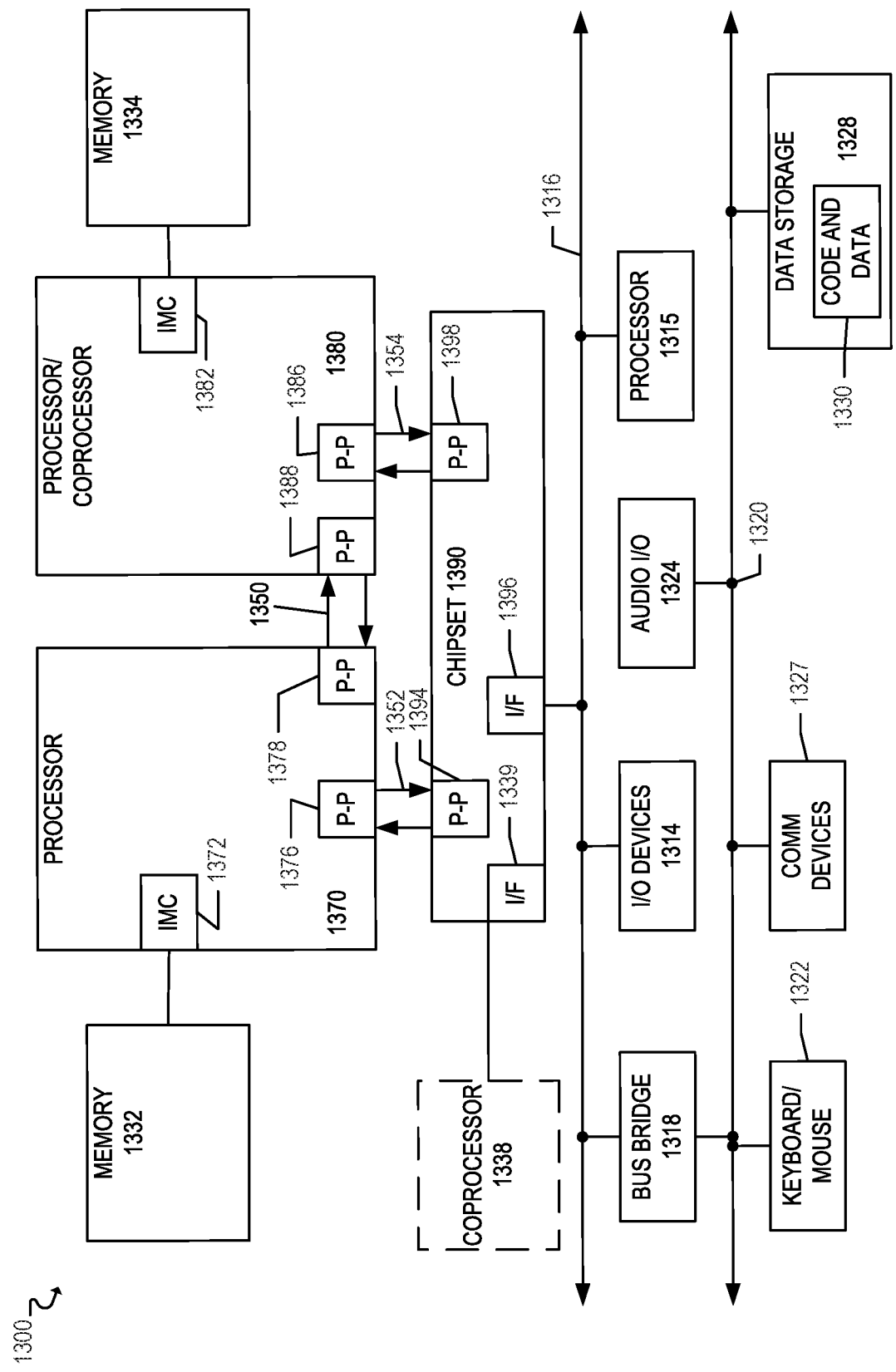

FIGS. 12 and 13 illustrate example computer processor architectures that can be used in accordance with embodiments disclosed herein. For example, in various embodiments, the computer architectures of FIGS. 12 and 13 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 12 illustrates a block diagram for an example embodiment of a processor 1200. Processor 1200 is an example of a type of hardware device that can be used in connection with the embodiments described throughout this disclosure. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 may also include register renaming logic and scheduling logic, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a block diagram for an example embodiment of a multiprocessor 1300. As shown in FIG. 13, multiprocessor system 1300 is a point-to-point interconnect system, and includes a first processor 1370 and a second processor 1380 coupled via a point-to-point interconnect 1350. In some embodiments, each of processors 1370 and 1380 may be some version of processor 1200 of FIG. 12.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of this disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

All or part of any component of FIG. 13 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's° industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a communication interface; and processing circuitry to: receive, via the communication interface, a compressed video stream captured by a camera, wherein the compressed video stream comprises a plurality of compressed video frames, wherein the plurality of compressed video frames comprises: a first compressed frame; and a second compressed frame, wherein the second compressed frame is compressed based at least in part on the first compressed frame, and wherein the second compressed frame comprises a plurality of motion vectors; decompress the first compressed frame into a first decompressed frame; perform pixel-domain object detection to detect an object at a first position in the first decompressed frame; and perform compressed-domain object detection to detect the object at a second position in the second compressed frame, wherein the object is detected at the second position in the second compressed frame based on: the first position of the object in the first decompressed frame; and the plurality of motion vectors from the second compressed frame.

In one example embodiment of an apparatus, the processing circuitry to perform compressed-domain object detection to detect the object at the second position in the second compressed frame is further to: identify a subset of motion vectors from the plurality of motion vectors in the second compressed frame, wherein the subset of motion vectors corresponds to the first position of the object in the first decompressed frame; compute an average motion vector based on the subset of motion vectors; and estimate the second position of the object in the second compressed frame based on: the first position of the object in the first decompressed frame; and the average motion vector.

In one example embodiment of an apparatus, the processing circuitry to perform compressed-domain object detection to detect the object at the second position in the second compressed frame is further to: generate a compressed-domain input for an artificial neural network, wherein the compressed-domain input comprises: a first channel comprising object bounding box information for the first decompressed frame, wherein the object bounding box information indicates the first position of the object in the first decompressed frame; a second channel comprising magnitude information for the plurality of motion vectors; and a third channel comprising angle information for the plurality of motion vectors; and process the compressed-domain input using the artificial neural network, wherein the artificial neural network is trained to perform object detection based on the compressed-domain input.

In one example embodiment of an apparatus: the plurality of compressed video frames further comprises a third compressed frame, wherein the third compressed frame is compressed based at least in part on the first compressed frame, and wherein the third compressed frame comprises a second plurality of motion vectors; and the processing circuitry is further to perform compressed-domain object detection to detect the object at a third position in the third compressed frame, wherein the object is detected at the third position in the third compressed frame based on: the first position of the object in the first compressed frame; and the second plurality of motion vectors from the third compressed frame.

In one example embodiment of an apparatus: the plurality of compressed video frames further comprises a third compressed frame, wherein the third compressed frame is compressed based at least in part on the second compressed frame, and wherein the third compressed frame comprises a second plurality of motion vectors; and the processing circuitry is further to perform compressed-domain object detection to detect the object at a third position in the third compressed frame, wherein the object is detected at the third position in the third compressed frame based on: the second position of the object in the second compressed frame; and the second plurality of motion vectors from the third compressed frame.

In one example embodiment of an apparatus: the first compressed frame is compressed based at least in part on a background frame; the processing circuitry to decompress the first compressed frame into the first decompressed frame is further to decompress the first compressed frame based at least in part on the background frame; and the processing circuitry to perform pixel-domain object detection to detect the object at the first position in the first decompressed frame is further to: determine a frame difference between the first decompressed frame and the background frame; and detect the object at the first position in the first decompressed frame based on the frame difference.

In one example embodiment of an apparatus, the processing circuitry to perform pixel-domain object detection to detect the object at the first position in the first decompressed frame is further to: process the first decompressed frame using a convolutional neural network, wherein the convolutional neural network is trained to perform object detection in a pixel domain.

In one example embodiment of an apparatus, the second compressed frame comprises a motion-predicted frame, wherein: the motion-predicted frame is compressed based at least in part on the first compressed frame; the motion-predicted frame comprises the plurality of motion vectors; and the motion-predicted frame does not comprise a prediction residual indicating a difference between the second compressed frame and the first compressed frame.

One or more embodiments may include at least one non-transitory machine accessible storage medium having instructions stored thereon, wherein the instructions, when executed on a machine, cause the machine to: receive, via a communication interface, a compressed video stream captured by a camera, wherein the compressed video stream comprises a plurality of compressed video frames, wherein the plurality of compressed video frames comprises: a first compressed frame; and a second compressed frame, wherein the second compressed frame is compressed based at least in part on the first compressed frame, and wherein the second compressed frame comprises a plurality of motion vectors; decompress the first compressed frame into a first decompressed frame; perform pixel-domain object detection to detect an object at a first position in the first decompressed frame; and perform compressed-domain object detection to detect the object at a second position in the second compressed frame, wherein the object is detected at the second position in the second compressed frame based on: the first position of the object in the first decompressed frame; and the plurality of motion vectors from the second compressed frame.

In one example embodiment of a storage medium, the instructions that cause the machine to perform compressed-domain object detection to detect the object at the second position in the second compressed frame further cause the machine to: identify a subset of motion vectors from the plurality of motion vectors in the second compressed frame, wherein the subset of motion vectors corresponds to the first position of the object in the first decompressed frame; compute an average motion vector based on the subset of motion vectors; and estimate the second position of the object in the second compressed frame based on: the first position of the object in the first decompressed frame; and the average motion vector.

In one example embodiment of a storage medium, the instructions that cause the machine to perform compressed-domain object detection to detect the object at the second position in the second compressed frame further cause the machine to: generate a compressed-domain input for an artificial neural network, wherein the compressed-domain input comprises: a first channel comprising object bounding box information for the first decompressed frame, wherein the object bounding box information indicates the first position of the object in the first decompressed frame; a second channel comprising magnitude information for the plurality of motion vectors; and a third channel comprising angle information for the plurality of motion vectors; and process the compressed-domain input using the artificial neural network, wherein the artificial neural network is trained to perform object detection based on the compressed-domain input.

In one example embodiment of a storage medium: the plurality of compressed video frames further comprises a third compressed frame, wherein the third compressed frame is compressed based at least in part on the first compressed frame, and wherein the third compressed frame comprises a second plurality of motion vectors; and the instructions further cause the machine to perform compressed-domain object detection to detect the object at a third position in the third compressed frame, wherein the object is detected at the third position in the third compressed frame based on: the first position of the object in the first compressed frame; and the second plurality of motion vectors from the third compressed frame.

In one example embodiment of a storage medium: the plurality of compressed video frames further comprises a third compressed frame, wherein the third compressed frame is compressed based at least in part on the second compressed frame, and wherein the third compressed frame comprises a second plurality of motion vectors; and the instructions further cause the machine to perform compressed-domain object detection to detect the object at a third position in the third compressed frame, wherein the object is detected at the third position in the third compressed frame based on: the second position of the object in the second compressed frame; and the second plurality of motion vectors from the third compressed frame.

In one example embodiment of a storage medium: the first compressed frame is compressed based at least in part on a background frame; the instructions that cause the machine to decompress the first compressed frame into the first decompressed frame further cause the machine to decompress the first compressed frame based at least in part on the background frame; and the instructions that cause the machine to perform pixel-domain object detection to detect the object at the first position in the first decompressed frame further cause the machine to: determine a frame difference between the first decompressed frame and the background frame; and detect the object at the first position in the first decompressed frame based on the frame difference.

In one example embodiment of a storage medium, the instructions that cause the machine to perform pixel-domain object detection to detect the object at the first position in the first decompressed frame further cause the machine to: process the first decompressed frame using a convolutional neural network, wherein the convolutional neural network is trained to perform object detection in a pixel domain.

In one example embodiment of a storage medium, the second compressed frame comprises a motion-predicted frame, wherein: the motion-predicted frame is compressed based at least in part on the first compressed frame; the motion-predicted frame comprises the plurality of motion vectors; and the motion-predicted frame does not comprise a prediction residual indicating a difference between the second compressed frame and the first compressed frame.

One or more embodiments may include a method, comprising: receiving, via a communication interface, a compressed video stream captured by a camera, wherein the compressed video stream comprises a plurality of compressed video frames, wherein the plurality of compressed video frames comprises: a first compressed frame; and a second compressed frame, wherein the second compressed frame is compressed based at least in part on the first compressed frame, and wherein the second compressed frame comprises a plurality of motion vectors; decompressing the first compressed frame into a first decompressed frame; performing pixel-domain object detection to detect an object at a first position in the first decompressed frame; and performing compressed-domain object detection to detect the object at a second position in the second compressed frame, wherein the object is detected at the second position in the second compressed frame based on: the first position of the object in the first decompressed frame; and the plurality of motion vectors from the second compressed frame.

In one example embodiment of a method, performing compressed-domain object detection to detect the object at the second position in the second compressed frame comprises: identifying a subset of motion vectors from the plurality of motion vectors in the second compressed frame, wherein the subset of motion vectors corresponds to the first position of the object in the first decompressed frame; computing an average motion vector based on the subset of motion vectors; and predicting the second position of the object in the second compressed frame based on: the first position of the object in the first decompressed frame; and the average motion vector.

In one example embodiment of a method, performing compressed-domain object detection to detect the object at the second position in the second compressed frame comprises: generating a compressed-domain input for an artificial neural network, wherein the compressed-domain input comprises: a first channel comprising object bounding box information for the first decompressed frame, wherein the object bounding box information indicates the first position of the object in the first decompressed frame; a second channel comprising magnitude information for the plurality of motion vectors; and a third channel comprising angle information for the plurality of motion vectors; and processing the compressed-domain input using the artificial neural network, wherein the artificial neural network is trained to perform object detection based on the compressed-domain input.

In one example embodiment of a method: the first compressed frame is compressed based at least in part on a background frame; decompressing the first compressed frame into the first decompressed frame comprises decompressing the first compressed frame based at least in part on the background frame; and performing pixel-domain object detection to detect the object at the first position in the first decompressed frame comprises: determining a frame difference between the first decompressed frame and the background frame; and detecting the object at the first position in the first decompressed frame based on the frame difference.

In one example embodiment of a method, the second compressed frame comprises a motion-predicted frame, wherein: the motion-predicted frame is compressed based at least in part on the first compressed frame; the motion-predicted frame comprises the plurality of motion vectors; and the motion-predicted frame does not comprise a prediction residual indicating a difference between the second compressed frame and the first compressed frame.

One or more embodiments may include a system, comprising: a camera; and an edge processing device, comprising: a communication interface; and processing circuitry to: receive, via the communication interface, a compressed video stream captured by the camera, wherein the compressed video stream comprises a plurality of compressed video frames, wherein the plurality of compressed video frames comprises: a first compressed frame; and a second compressed frame, wherein the second compressed frame is compressed based at least in part on the first compressed frame, and wherein the second compressed frame comprises a plurality of motion vectors; decompress the first compressed frame into a first decompressed frame; perform pixel-domain object detection to detect an object at a first position in the first decompressed frame; and perform compressed-domain object detection to detect the object at a second position in the second compressed frame, wherein the object is detected at the second position in the second compressed frame based on: the first position of the object in the first decompressed frame; and the plurality of motion vectors from the second compressed frame.

In one example embodiment of a system, the processing circuitry to perform compressed-domain object detection to detect the object at the second position in the second compressed frame is further to: identify a subset of motion vectors from the plurality of motion vectors in the second compressed frame, wherein the subset of motion vectors corresponds to the first position of the object in the first decompressed frame; compute an average motion vector based on the subset of motion vectors; and estimate the second position of the object in the second compressed frame based on: the first position of the object in the first decompressed frame; and the average motion vector.

In one example embodiment of a system, the processing circuitry to perform compressed-domain object detection to detect the object at the second position in the second compressed frame is further to: generate a compressed-domain input for an artificial neural network, wherein the compressed-domain input comprises: a first channel comprising object bounding box information for the first decompressed frame, wherein the object bounding box information indicates the first position of the object in the first decompressed frame; a second channel comprising magnitude information for the plurality of motion vectors; and a third channel comprising angle information for the plurality of motion vectors; and process the compressed-domain input using the artificial neural network, wherein the artificial neural network is trained to perform object detection based on the compressed-domain input.

In one example embodiment of a system: the first compressed frame is compressed based at least in part on a background frame; the processing circuitry to decompress the first compressed frame into the first decompressed frame is further to decompress the first compressed frame based at least in part on the background frame; and the processing circuitry to perform pixel-domain object detection to detect the object at the first position in the first decompressed frame is further to: determine a frame difference between the first decompressed frame and the background frame; and detect the object at the first position in the first decompressed frame based on the frame difference.

What is claimed is:

1. An apparatus, comprising:
a communication interface; and
processing circuitry to:
receive, via the communication interface, a plurality of frames of a compressed video stream, wherein the plurality of frames is represented in a compressed domain, and wherein the plurality of frames comprises:
a first frame; and
a second frame compressed based at least in part on the first frame, wherein the second frame comprises a plurality of motion vectors representing an estimated motion of a plurality of blocks of the second frame relative to the first frame;
decompress the first frame from the compressed domain into a pixel domain;
perform object detection on the first frame in the pixel domain, wherein an object is detected at a first position in the first frame; and
perform object detection on the second frame in the compressed domain, wherein:
the plurality of motion vectors is extracted from the second frame;
a derivative motion vector is computed from the plurality of motion vectors, wherein the derivative motion vector represents an estimated motion of the object from the first frame to the second frame; and
a second position of the object in the second frame is predicted based on the first position of the object in the first frame and the derivative motion vector.

2. The apparatus of claim 1, wherein the processing circuitry to perform object detection on the second frame in the compressed domain is further to:
extract the plurality of motion vectors from the second frame, wherein the plurality of motion vectors represents the estimated motion of the plurality of blocks in the second frame that are collocated with the first position of the object in the first frame;
compute, based on the plurality of motion vectors, the derivative motion vector representing the estimated motion of the object from the first frame to the second frame; and
predict the second position of the object in the second frame based on:
the first position of the object in the first frame; and
the derivative motion vector representing the estimated motion of the object from the first frame to the second frame.

3. The apparatus of claim 1, wherein the processing circuitry to perform object detection on the second frame in the compressed domain is further to:
generate a compressed-domain input for an artificial neural network, wherein the compressed-domain input comprises:
a first channel comprising object bounding box information for the first frame, wherein the object bounding box information indicates the first position of the object in the first frame;
a second channel comprising magnitude information for the plurality of motion vectors; and
a third channel comprising angle information for the plurality of motion vectors; and
process the compressed-domain input using the artificial neural network, wherein the artificial neural network is trained to perform object detection based on the compressed-domain input.

4. The apparatus of claim 1, wherein:
the plurality of frames further comprises a third frame, wherein the third frame is compressed based at least in part on the first frame, and wherein the third frame comprises a second plurality of motion vectors; and
the processing circuitry is further to perform object detection on the third frame in the compressed domain, wherein:
the second plurality of motion vectors is extracted from the third frame;

an estimated motion of the object from the first frame to the third frame is computed using the second plurality of motion vectors; and a third position of the object in the third frame is predicted based on the first position of the object in the first frame and the estimated motion of the object from the first frame to the third frame.

5. The apparatus of claim 1, wherein:

the plurality of frames further comprises a third frame, wherein the third frame is compressed based at least in part on the second frame, and wherein the third frame comprises a second plurality of motion vectors; and the processing circuitry is further to perform object detection on the third frame in the compressed domain, wherein:

the second plurality of motion vectors is extracted from the third frame;

an estimated motion of the object from the second frame to the third frame is computed using the second plurality of motion vectors; and a third position of the object in the third frame is predicted based on the second position of the object in the second frame and the estimated motion of the object from the second frame to the third frame.

6. The apparatus of claim 1, wherein:

the first frame is compressed based at least in part on a background frame;

the processing circuitry to decompress the first frame from the compressed domain into the pixel domain is further to decompress the first frame based at least in part on the background frame; and the processing circuitry to perform object detection on the first frame in the pixel domain is further to:

determine a frame difference between the first frame and the background frame; and detect the object at the first position in the first frame based on the frame difference.

7. The apparatus of claim 1, wherein the processing circuitry to perform object detection on the first frame in the pixel domain is further to:

process the first frame in the pixel domain using a convolutional neural network, wherein the convolutional neural network is trained to perform object detection in the pixel domain.

8. The apparatus of claim 1, wherein the second frame comprises a motion-predicted frame, wherein:

the motion-predicted frame is compressed based at least in part on the first frame;

the motion-predicted frame comprises the plurality of motion vectors; and the motion-predicted frame does not comprise a prediction residual indicating a difference between the second frame and the first frame.

9. At least one non-transitory machine accessible storage medium having instructions stored thereon, wherein the instructions, when executed on a machine, cause the machine to:

receive, via a communication interface, a plurality of frames of a compressed video stream, wherein the plurality of frames is represented in a compressed domain, and wherein the plurality of frames comprises:

a first frame; and a second frame compressed based at least in part on the first frame, wherein the second frame comprises a plurality of motion vectors representing an estimated motion of a plurality of blocks of the second frame relative to the first frame;

decompress the first frame from the compressed domain into a pixel domain;

perform object detection on the first frame in the pixel domain, wherein an object is detected at a first position in the first frame; and perform object detection on the second frame in the compressed domain, wherein:

the plurality of motion vectors is extracted from the second frame;

a derivative motion vector is computed from the plurality of motion vectors, wherein the derivative motion vector represents an estimated motion of the object from the first frame to the second frame; and a second position of the object in the second frame is predicted based on the first position of the object in the first frame and the derivative motion vector.

10. The storage medium of claim 9, wherein the instructions that cause the machine to perform object detection on the second frame in the compressed domain further cause the machine to:

extract the plurality of motion vectors from the second frame, wherein the plurality of motion vectors represents the estimated motion of the plurality of blocks in the second frame that are collocated with the first position of the object in the first frame;

compute, based on the plurality of motion vectors, the derivative motion vector representing the estimated motion of the object from the first frame to the second frame; and predict the second position of the object in the second frame based on:

the first position of the object in the first frame; and the derivative motion vector representing the estimated motion of the object from the first frame to the second frame.

11. The storage medium of claim 9, wherein the instructions that cause the machine to perform object detection on the second frame in the compressed domain further cause the machine to:

generate a compressed-domain input for an artificial neural network, wherein the compressed-domain input comprises:

a first channel comprising object bounding box information for the first frame, wherein the object bounding box information indicates the first position of the object in the first frame;

a second channel comprising magnitude information for the plurality of motion vectors; and a third channel comprising angle information for the plurality of motion vectors; and process the compressed-domain input using the artificial neural network, wherein the artificial neural network is trained to perform object detection based on the compressed-domain input.

12. The storage medium of claim 9, wherein:

the plurality of frames further comprises a third frame, wherein the third frame is compressed based at least in part on the first frame, and wherein the third frame comprises a second plurality of motion vectors; and the instructions further cause the machine to perform object detection on the third frame in the compressed domain, wherein:

the second plurality of motion vectors is extracted from the third frame;

an estimated motion of the object from the first frame to the third frame is computed using the second plurality of motion vectors; and a third position of the object in the third frame is predicted based on the first position of the object in the first frame and the estimated motion of the object from the first frame to the third frame.

13. The storage medium of claim 9, wherein:
the plurality of frames further comprises a third frame, wherein the third frame is compressed based at least in part on the second frame, and wherein the third frame comprises a second plurality of motion vectors; and
the instructions further cause the machine to perform object detection on the third frame in the compressed domain, wherein:
the second plurality of motion vectors is extracted from the third frame;
an estimated motion of the object from the second frame to the third frame is computed using the second plurality of motion vectors; and
a third position of the object in the third frame is predicted based on the second position of the object in the second frame and the estimated motion of the object from the second frame to the third frame.

14. The storage medium of claim 9, wherein:
the first frame is compressed based at least in part on a background frame;
the instructions that cause the machine to decompress the first frame from the compressed domain into the pixel domain further cause the machine to decompress the first frame based at least in part on the background frame; and
the instructions that cause the machine to perform object detection on the first frame in the pixel domain further cause the machine to:
determine a frame difference between the first frame and the background frame; and
detect the object at the first position in the first frame based on the frame difference.

15. The storage medium of claim 9, wherein the instructions that cause the machine to perform object detection on the first frame in the pixel domain further cause the machine to:
process the first frame in the pixel domain using a convolutional neural network, wherein the convolutional neural network is trained to perform object detection in the pixel domain.

16. The storage medium of claim 9, wherein the second frame comprises a motion-predicted frame, wherein:
the motion-predicted frame is compressed based at least in part on the first frame;
the motion-predicted frame comprises the plurality of motion vectors; and
the motion-predicted frame does not comprise a prediction residual indicating a difference between the second frame and the first frame.

17. A method, comprising:
receiving, via a communication interface, a plurality of frames of a compressed video stream, wherein the plurality of frames is represented in a compressed domain, and wherein the plurality of frames comprises:
a first frame; and
a second frame compressed based at least in part on the first frame, wherein the second frame comprises a plurality of motion vectors representing an estimated motion of a plurality of blocks of the second frame relative to the first frame;
decompressing the first frame from the compressed domain into a pixel domain;
performing object detection on the first frame in the pixel domain, wherein an object is detected at a first position in the first frame; and
performing object detection on the second frame in the compressed domain, wherein:
the plurality of motion vectors is extracted from the second frame;
a derivative motion vector is computed from the plurality of motion vectors, wherein the derivative motion vector represents an estimated motion of the object from the first frame to the second frame; and
a second position of the object in the second frame is predicted based on the first position of the object in the first frame and the derivative motion vector.

18. The method of claim 17, wherein performing object detection on the second frame in the compressed domain comprises:
extracting the plurality of motion vectors from the second frame, wherein the plurality of motion vectors represents the estimated motion of the plurality of blocks in the second frame that are collocated with the first position of the object in the first frame;
computing, based on the plurality of motion vectors, the derivative motion vector representing the estimated motion of the object from the first frame to the second frame; and
predicting the second position of the object in the second frame based on:
the first position of the object in the first frame; and
the derivative motion vector representing the estimated motion of the object from the first frame to the second frame.

19. The method of claim 17, wherein performing object detection on the second frame in the compressed domain comprises:
generating a compressed-domain input for an artificial neural network, wherein the compressed-domain input comprises:
a first channel comprising object bounding box information for the first frame, wherein the object bounding box information indicates the first position of the object in the first frame;
a second channel comprising magnitude information for the plurality of motion vectors; and
a third channel comprising angle information for the plurality of motion vectors; and
processing the compressed-domain input using the artificial neural network, wherein the artificial neural network is trained to perform object detection based on the compressed-domain input.

20. The method of claim 17, wherein:
the first frame is compressed based at least in part on a background frame;
decompressing the first frame from the compressed domain into the pixel domain comprises decompressing the first frame based at least in part on the background frame; and
performing object detection on the first frame in the pixel domain comprises:
determining a frame difference between the first frame and the background frame; and
detecting the object at the first position in the first frame based on the frame difference.

21. The method of claim 17, wherein the second frame comprises a motion-predicted frame, wherein:
the motion-predicted frame is compressed based at least in part on the first frame;

the motion-predicted frame comprises the plurality of motion vectors; and the motion-predicted frame does not comprise a prediction residual indicating a difference between the second frame and the first frame.

22. A system, comprising:

a camera; and processing circuitry to:
- receive a plurality of frames of a compressed video stream captured by the camera, wherein the plurality of frames is represented in a compressed domain, and wherein the plurality of frames comprises:
  - a first frame; and
  - a second frame compressed based at least in part on the first frame, wherein the second frame comprises a plurality of motion vectors representing an estimated motion of a plurality of blocks of the second frame relative to the first frame;
- decompress the first frame from the compressed domain into a pixel domain;
- perform object detection on the first frame in the pixel domain, wherein an object is detected at a first position in the first frame; and
- perform object detection on the second frame in the compressed domain, wherein:
  - the plurality of motion vectors is extracted from the second frame;
  - a derivative motion vector is computed from the plurality of motion vectors, wherein the derivative motion vector represents an estimated motion of the object from the first frame to the second frame; and
  - a second position of the object in the second frame is predicted based on the first position of the object in the first frame and the derivative motion vector.

23. The system of claim 22, wherein the processing circuitry to perform object detection on the second frame in the compressed domain is further to:
- extract the plurality of motion vectors from the second frame, wherein the plurality of motion vectors represent the estimated motion of the plurality of blocks in the second frame that are collocated with the first position of the object in the first frame;
- compute, based on the plurality of motion vectors, the derivative motion vector representing the estimated motion of the object from the first frame to the second frame; and
- predict the second position of the object in the second frame based on:
  - the first position of the object in the first frame; and
  - the derivative motion vector representing the estimated motion of the object from the first frame to the second frame.

24. The system of claim 22, wherein the processing circuitry to perform object detection on the second frame in the compressed domain is further to:
- generate a compressed-domain input for an artificial neural network, wherein the compressed-domain input comprises:
  - a first channel comprising object bounding box information for the first frame, wherein the object bounding box information indicates the first position of the object in the first frame;
  - a second channel comprising magnitude information for the plurality of motion vectors; and
  - a third channel comprising angle information for the plurality of motion vectors; and
- process the compressed-domain input using the artificial neural network, wherein the artificial neural network is trained to perform object detection based on the compressed-domain input.

25. The system of claim 22, wherein:
- the first frame is compressed based at least in part on a background frame;
- the processing circuitry to decompress the first frame from the compressed domain into a pixel domain is further to decompress the first frame based at least in part on the background frame; and
- the processing circuitry to perform object detection on the first frame in the pixel domain is further to:
  - determine a frame difference between the first frame and the background frame; and
  - detect the object at the first position in the first frame based on the frame difference.

26. The apparatus of claim 2, wherein the processing circuitry to compute, based on the plurality of motion vectors, the derivative motion vector representing the estimated motion of the object from the first frame to the second frame is further to:
- compute the derivative motion vector based on an average of the plurality of motion vectors.

* * * * *